US009429165B2

(12) United States Patent
Tamaoka et al.

(10) Patent No.: US 9,429,165 B2
(45) Date of Patent: Aug. 30, 2016

(54) BEARING MECHANISM, MOTOR, AND BLOWER FAN

(71) Applicant: Nidec Corporation, Kyoto (JP)

(72) Inventors: Takehito Tamaoka, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 346 days.

(21) Appl. No.: 14/209,088

(22) Filed: Mar. 13, 2014

(65) Prior Publication Data

US 2015/0010411 A1 Jan. 8, 2015

(30) Foreign Application Priority Data

Jul. 5, 2013 (JP) ................................. 2013-141291

(51) Int. Cl.
| | |
|---|---|
| *F16C 17/10* | (2006.01) |
| *F04D 29/057* | (2006.01) |
| *F16C 33/74* | (2006.01) |
| *F04D 19/00* | (2006.01) |
| *F04D 25/06* | (2006.01) |
| *F04D 29/063* | (2006.01) |

(52) U.S. Cl.
CPC ........... *F04D 29/057* (2013.01); *F04D 19/002* (2013.01); *F04D 25/062* (2013.01); *F04D 29/063* (2013.01); *F16C 17/107* (2013.01); *F16C 33/745* (2013.01); *F16C 2360/46* (2013.01)

(58) Field of Classification Search
CPC .. F16C 17/107; F16C 33/745; F04D 29/057; F04D 19/002; F04D 25/062; F04D 25/063
See application file for complete search history.

(56) References Cited

U.S. PATENT DOCUMENTS

| | | | | |
|---|---|---|---|---|
| 6,817,766 B2* | 11/2004 | Gomyo | ................... | F16C 17/10 384/100 |
| 6,834,996 B2* | 12/2004 | Gomyo | ................. | F16C 17/107 384/100 |

(Continued)

FOREIGN PATENT DOCUMENTS

| | | |
|---|---|---|
| CN | 1821598 A | 8/2006 |
| CN | 102852832 A | 1/2013 |

(Continued)

OTHER PUBLICATIONS

Related to U.S. Appl. No. 14/149,052.

*Primary Examiner* — Thomas R. Hannon
(74) *Attorney, Agent, or Firm* — Westerman, Hattori, Daniels & Adrian, LLP

(57) ABSTRACT

In a bearing mechanism according to a preferred embodiment of the present invention, a seal portion in which a surface of a lubricating oil is located is defined in a seal gap defined between an outer circumferential surface of a first tubular portion and an inner circumferential surface of a second tubular portion. The first tubular portion includes, in an area where the outer circumferential surface of the first tubular portion is in contact with the lubricating oil, a maximum outside diameter portion at which the outside diameter of the first tubular portion is greatest, an annular shoulder portion including a surface facing toward the surface of the lubricating oil and at which the outside diameter is smaller than at the maximum outside diameter portion, and an inclined portion at which the outside diameter gradually decreases from the annular shoulder portion toward the surface of the lubricating oil.

16 Claims, 17 Drawing Sheets

(56) References Cited

U.S. PATENT DOCUMENTS

| | | |
|---|---|---|
| 2006/0051001 A1 | 3/2006 | Nishimura et al. |
| 2009/0022438 A1 | 1/2009 | Tamaoka |
| 2010/0002966 A1 | 1/2010 | Hori et al. |
| 2010/0084932 A1* | 4/2010 | Li .................... F04D 29/057 |
| | | 310/89 |
| 2011/0115323 A1* | 5/2011 | Jang .................. F16C 17/107 |
| | | 310/90 |

FOREIGN PATENT DOCUMENTS

| | | |
|---|---|---|
| JP | 2005-282779 A | 10/2005 |
| JP | 2007-100802 A | 4/2007 |
| JP | 2008-138713 A | 6/2008 |
| JP | 2008-163969 A | 7/2008 |

* cited by examiner

BEARING MECHANISM, MOTOR, AND BLOWER FAN

BACKGROUND OF THE INVENTION

1. Field of the Invention

The present invention relates to a bearing mechanism using fluid dynamic pressure. The bearing mechanism is used, for example, in a motor.

2. Description of the Related Art

Some known bearing mechanisms used in motors use fluid dynamic pressure. Such a bearing mechanism is described, for example, in JP-A 2007-100802. In this bearing mechanism, a sleeve is accommodated in a housing. The housing of the bearing mechanism described in JP-A 2007-100802 is a molded article produced by an injection molding process using a resin and molds which can be separated from each other in an axial direction. A parting line of the housing is defined in an outer circumferential surface thereof within an axial range within which neither a tapered surface where an oil surface of a lubricating oil is defined nor a surface to which a holding member is fixed exists.

In the case where a seal portion where a surface of a lubricating oil is located is defined in a seal gap between an outer circumferential surface of a first tubular portion and an inner circumferential surface of a second tubular portion concentric with the first tubular portion, the outer circumferential surface of the first tubular portion includes an inclined portion where the outside diameter of the first tubular portion gradually decreases along the axial direction from a point at which the first tubular portion has the greatest outside diameter. In the case where the first tubular portion having the above structure is molded by using an upper mold and a lower mold which are separated in the axial direction, a parting line is defined in the vicinity of the point at which the first tubular portion has the greatest outside diameter. In this case, depending on design of the upper and lower molds, an air bubble in the lubricating oil may easily stay in the vicinity of the point at which the first tubular portion has the greatest outside diameter in the bearing mechanism.

SUMMARY OF THE INVENTION

A bearing mechanism according to a preferred embodiment of the present invention includes a first component portion including a first tubular portion centered on a central axis extending in a vertical direction; a second component portion including a second tubular portion centered on the central axis, and arranged to be rotatable relative to the first component portion, an inner circumferential surface of the second tubular portion being arranged radially opposite an outer circumferential surface of the first tubular portion; and a lubricating oil. One of the first and second component portions includes a shaft centered on the central axis, while the other of the first and second component portions includes a sleeve in which the shaft is inserted. The lubricating oil is arranged to continuously exist between a portion including the sleeve and a portion including the shaft. A radial dynamic pressure bearing portion is defined between the shaft and the sleeve, or a thrust dynamic pressure bearing portion is defined in a thrust gap between an upper surface of the sleeve and a member opposed to the upper surface of the sleeve. The outer circumferential surface of the first tubular portion and the inner circumferential surface of the second tubular portion are arranged to together define a seal gap therebetween, the seal gap including a seal portion in which a surface of the lubricating oil is located. A member including the first tubular portion is either a resin-molded article or a metal die-cast article. The first tubular portion includes, in an area where the outer circumferential surface of the first tubular portion and the lubricating oil are in contact with each other, a maximum outside diameter portion at which the first tubular portion is arranged to have a greatest outside diameter, an annular shoulder portion including a surface facing toward the surface of the lubricating oil and at which the first tubular portion is arranged to have an outside diameter smaller than that of the maximum outside diameter portion, and an inclined portion at which the outside diameter of the first tubular portion is arranged to gradually decrease from the annular shoulder portion toward the surface of the lubricating oil. The outer circumferential surface of the first tubular portion includes a line joining the maximum outside diameter portion and the annular shoulder portion to each other.

According to the above preferred embodiment of the present invention, which is directed to the bearing mechanism using the first tubular portion which is the resin-molded article or the metal die-cast article, the likelihood that any air bubble in the lubricating oil will stay in the vicinity of the maximum outside diameter portion of the first tubular portion is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
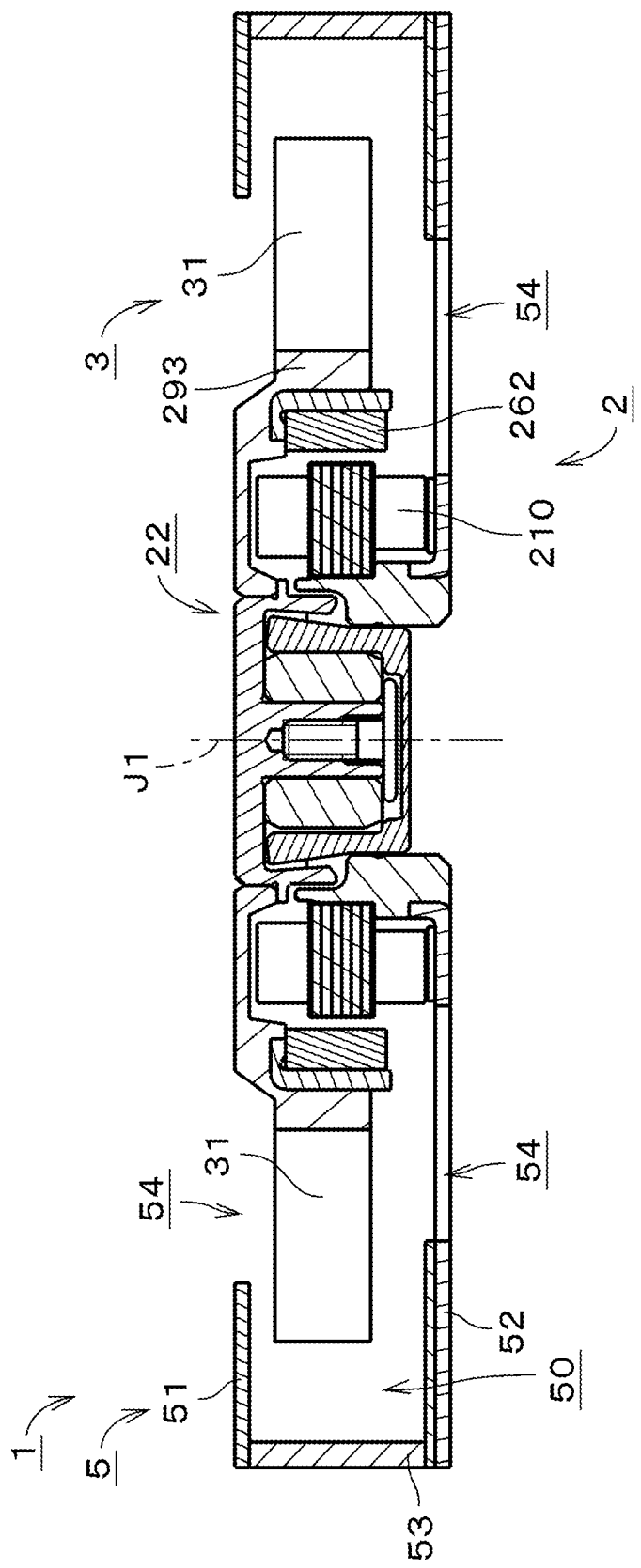
FIG. 1 is a vertical cross-sectional view of a blower fan according to a first preferred embodiment of the present invention.

It is assumed herein that an upper side and a lower side in a direction parallel to a central axis J1 of a blower fan 1 illustrated in FIG. 1 are referred to simply as an upper side and a lower side, respectively. Note that a vertical direction assumed herein may not necessarily correspond with a vertical direction of the blower fan 1 when the blower fan 1 is actually installed in a device. It is also assumed herein that a circumferential direction about the central axis J1 is simply referred to by the term "circumferential direction", "circumferential", or "circumferentially", that radial directions centered on the central axis J1 are simply referred to by the term "radial direction", "radial", or "radially", and that the direction parallel to the central axis J1 is simply referred to by the term "axial direction", "axial", or "axially".

First Preferred Embodiment

FIG. 1 is a vertical cross-sectional view of the blower fan 1 according to a first preferred embodiment of the present invention. The blower fan 1 is a centrifugal fan. The blower fan 1 is, for example, installed in a notebook personal computer, and is used to cool devices inside a case of the computer.

The blower fan 1 includes a motor portion 2, an impeller 3, and a housing 5. A central axis of the impeller 3 coincides with the central axis J1 of the motor portion 2. The impeller 3 includes a plurality of blades 31. The blades 31 are arranged in a circumferential direction about the central axis J1. The motor portion 2 is arranged to rotate the blades 31 about the central axis J1. The housing 5 is arranged to accommodate the motor portion 2 and the impeller 3.

The housing 5 includes an upper plate 51, a lower plate 52, and a side wall portion 53. The upper plate 51 is arranged to cover an upper side of the blades 31. The lower plate 52 is arranged to cover a lower side of the blades 31. The motor portion 2 is fixed to the lower plate 52. The side wall portion 53 is arranged to cover a lateral side of the blades 31. The upper plate 51, the side wall portion 53, and the lower plate 52 are arranged to together define an air channel portion 50 arranged to surround the impeller 3.

Each of the upper and lower plates 51 and 52 is made of a metal, such as an aluminum alloy or stainless steel, and is defined in the shape of a thin plate. The side wall portion 53 is made of an aluminum alloy, and is molded by die casting. Alternatively, the side wall portion 53 may be molded of a resin. A lower end portion of the side wall portion 53 and an edge portion of the lower plate 52 are joined to each other through screws or the like. The upper plate 51 is fixed to an upper end portion of the side wall portion 53 by crimping or the like. Each of the upper and lower plates 51 and 52 includes an air inlet 54. The air inlets 54 are located above and below the impeller 3. The upper plate 51, the side wall portion 53, and the lower plate 52 are arranged to together define an air outlet on a lateral side of the blades 31. Note that the lower plate 52 is arranged to define a portion of a stationary portion 21, which will be described below, of the motor portion 2.

Figure 2:
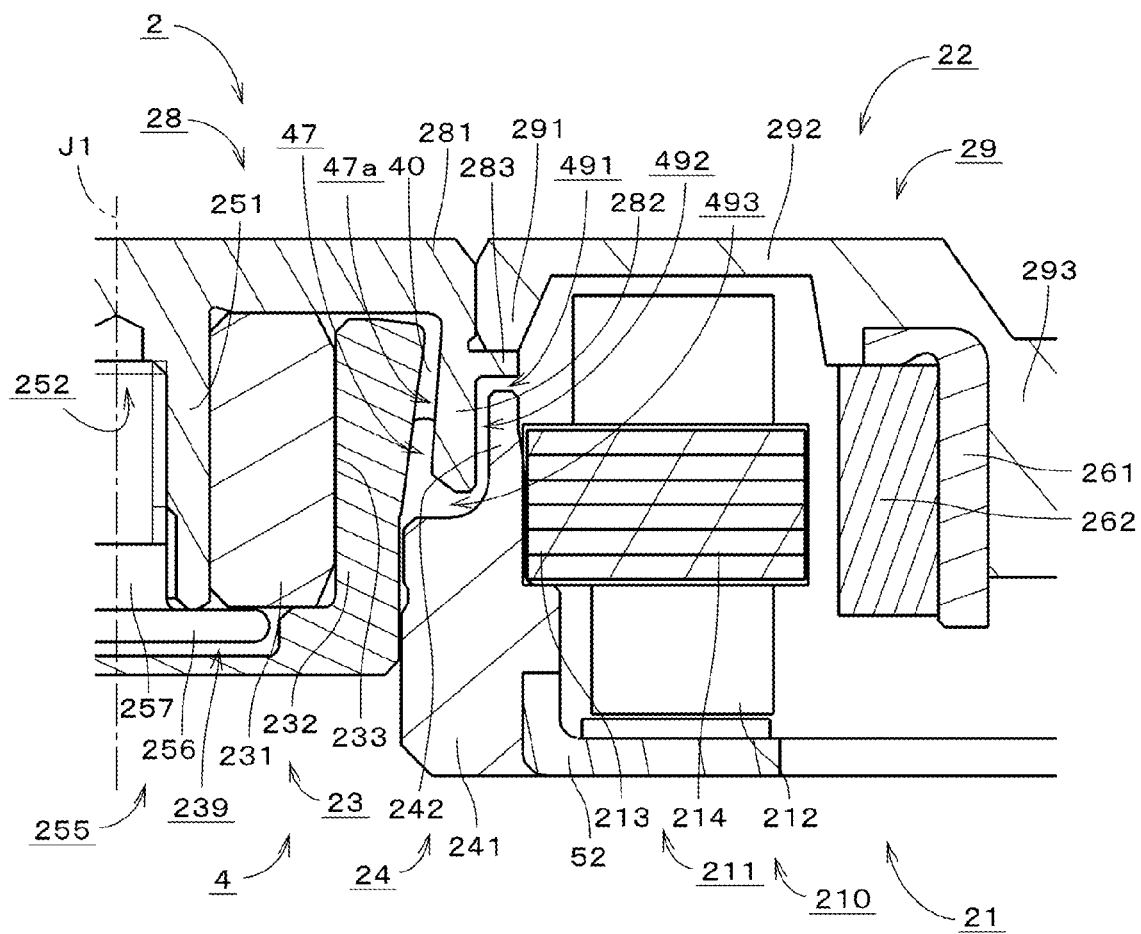
FIG. 2 is a vertical cross-sectional view of a motor portion and its vicinity according to the above preferred embodiment.

FIG. 2 is a vertical cross-sectional view of the motor portion 2 and its vicinity. The motor portion 2 is of an outer-rotor type. The motor portion 2 includes the stationary portion 21, which is a stationary assembly, and a rotating portion 22, which is a rotating assembly. Since a bearing mechanism 4 is defined by a portion of the stationary portion 21 and a portion of the rotating portion 22 as described below, the motor portion 2 can be considered to include the stationary portion 21, the bearing mechanism 4, and the rotating portion 22 when the bearing mechanism 4 is regarded as a component of the motor portion 2. The rotating portion 22 is supported by the bearing mechanism 4 to be rotatable about the central axis J1 with respect to the stationary portion 21.

The stationary portion 21 includes a stator 210, a bearing portion 23, a bushing 24, and the lower plate 52. The bearing portion 23 has a bottom and is substantially cylindrical and centered on the central axis J1. The bearing portion 23 includes a sleeve 231 and a sleeve housing 232. In the present preferred embodiment, a component including the sleeve 231 and the sleeve housing 232 corresponds to a first component portion of the bearing mechanism. The sleeve 231 is substantially cylindrical and centered on the central axis J1. The sleeve 231 is a metallic sintered body. The sleeve 231 is impregnated with a lubricating oil 40. An improvement in flexibility in choosing a material of an inner circumferential portion of the bearing portion 23 is achieved by the bearing portion 23 being composed of two components. In addition, an increase in the amount of the lubricating oil 40 held in the bearing portion 23 is easily achieved by the sleeve 231 being a sintered body.

The sleeve housing 232 has a bottom and is substantially cylindrical and centered on the central axis J1. The sleeve housing 232 is arranged to cover an outer circumferential surface and a lower surface of the sleeve 231. The sleeve 231 is fixed to an inner circumferential surface of the sleeve housing 232 through an adhesive 233. The sleeve housing 232 is made of a resin. Preferably, both adhesion and press fit are used to fix the sleeve 231 and the sleeve housing 232 to each other. A radially inner portion of the lower surface of the sleeve 231 is spaced away from an inner bottom surface of the sleeve housing 232 in the vertical direction. The lower surface of the sleeve 231 and the inner circumferential surface and the inner bottom surface of the sleeve housing 232 are arranged to together define a plate accommodating portion 239.

The bushing 24 is a substantially annular member centered on the central axis J1. The bushing 24 is preferably an insulating member. More preferably, the bushing 24 is molded of a resin. The bushing 24 includes a bushing body portion 241 and a bushing projecting portion 242. The bushing body portion 241 and the bushing projecting portion 242 are preferably defined integrally with each other. The bushing body portion 241 is substantially cylindrical and centered on the central axis J1. The bushing projecting portion 242 is also substantially cylindrical and centered on the central axis J1. The bushing projecting portion 242 is arranged to have a radial thickness smaller than that of the bushing body portion 241. The bushing projecting portion 242 is arranged to project upward from an outer periphery portion of an upper surface of the bushing body portion 241.

A lower portion of an outer circumferential surface of the sleeve housing 232 is fixed to an inner circumferential surface of the bushing body portion 241 through an adhesive. Note that both adhesion and press fit may be used to fix the sleeve housing 232 and the bushing 24 to each other. A lower portion of an outer circumferential surface of the bushing 24 is fixed in a hole portion defined in the lower plate 52.

The stator 210 is a substantially annular member centered on the central axis J1. The stator 210 is fixed to the outer circumferential surface of the bushing 24. The stator 210 includes a stator core 211 and a plurality of coils 212. The stator core 211 is defined by laminated silicon steel sheets each of which is in the shape of a thin plate. The stator core 211 includes a substantially annular core back 213 and a plurality of teeth 214 arranged to project radially outward from the core back 213. Each of the coils 212 is defined by a conducting wire wound around a separate one of the teeth 214.

The bushing 24 is press fitted to the core back 213. An inner circumferential surface of the core back 213 is fixed to both an upper portion of an outer circumferential surface of the bushing body portion 241 and a lower portion of an outer circumferential surface of the bushing projecting portion 242. An upper end of the bushing projecting portion 242 is arranged at a level higher than that of an upper end of the core back 213. A large area of contact between the inner circumferential surface of the core back 213 and the outer circumferential surface of the bushing 24 is thereby secured. This results in an increase in strength with which the core back 213 and the bushing 24 are joined to each other. Note that adhesion or slight press fit may be used to fix the core back 213 and the bushing 24 to each other. Also note that both adhesion and press fit may be used to fix the core back 213 and the bushing 24 to each other.

As described above, the bushing 24 is a holding portion arranged to have the stator 210 fixed to an outer circumferential surface thereof and to have the bearing portion 23 fixed to an inner circumferential surface thereof. In the motor portion 2, both the stator 210 and the bearing portion 23 are indirectly fixed to the lower plate 52, which is a base portion, as a result of the bushing 24 being fixed to the lower plate 52.

The rotating portion 22 includes a central rotating portion 28, a coming-off preventing portion 255, a cup portion 29, a yoke 261, and a rotor magnet 262. The central rotating portion 28 is supported by the bearing portion 23. The cup portion 29 is a member separate from the central rotating portion 28. The cup portion 29 is annular and centered on the central axis J1. The cup portion 29 is fixed to the central rotating portion 28 radially outside the central rotating portion 28. In the present preferred embodiment, a component including the central rotating portion 28 corresponds to a second component portion of the bearing mechanism arranged to be rotatable relative to the first component portion.

The central rotating portion 28 includes a shaft 251, a bearing opposing portion 281, and a cylindrical seal portion 282. The shaft 251, the bearing opposing portion 281, and the cylindrical seal portion 282 are defined by a single continuous member. The central rotating portion 28 is preferably defined by subjecting a metal to a cutting process.

The shaft 251 is substantially columnar and centered on the central axis J1. The shaft 251 is inserted in the sleeve 231 of the bearing portion 23. In other words, the sleeve 231 is arranged to surround the shaft 251 from radially outside. The shaft 251 is arranged to rotate about the central axis J1 relative to the bearing portion 23.

The coming-off preventing portion 255 is arranged at a lower portion of the shaft 251. The coming-off preventing portion 255 includes a plate portion 256 and a plate fixing portion 257. The plate portion 256 is substantially in the shape of a disk and arranged to extend radially outward from a lower end portion of the shaft 251. The plate portion 256 is arranged to have a diameter smaller than that of the lower surface of the sleeve 231. The plate fixing portion 257 is arranged to extend upward from an upper surface of the plate portion 256. An outer circumferential surface of the plate fixing portion 257 includes a male screw portion defined therein. The shaft 251 includes a hole portion 252 arranged to extend upward from a lower end thereof. An inner circumferential surface of the hole portion 252 includes a female screw portion defined therein. The plate fixing portion 257 is screwed into the hole portion 252, whereby the plate portion 256 is fixed to the lower end portion of the shaft 251.

Both the sleeve 231 and the plate portion 256 are arranged inside the sleeve housing 232. The plate portion 256 is accommodated in the aforementioned plate accommodating portion 239. The upper surface of the plate portion 256 is a substantially annular surface. The upper surface of the plate portion 256 is arranged opposite to the lower surface of the sleeve 231, that is, a downward facing surface in the plate accommodating portion 239, in the vertical direction. The plate portion 256 and the sleeve 231 are arranged to together prevent the shaft 251 from coming off the bearing portion 23. A lower surface of the plate portion 256 is arranged opposite to the inner bottom surface of the sleeve housing 232 in the vertical direction.

The bearing opposing portion 281 is arranged to extend radially outward from an upper end of the shaft 251. The bearing opposing portion 281 is a substantially annular plate-shaped portion centered on the central axis J1. The bearing opposing portion 281 is arranged above the bearing portion 23 and opposite to the bearing portion 23 in the vertical direction. The cylindrical seal portion 282 is a substantially cylindrical hanging-down portion arranged to extend downward from the bearing opposing portion 281. The cylindrical seal portion 282 is continuous with an outer periphery portion of the bearing opposing portion 281. The cylindrical seal portion 282 is arranged radially outward of the bearing portion 23 and radially inward of the stator 210. An inner circumferential surface of the cylindrical seal portion 282 is arranged radially opposite an upper portion of an outer circumferential surface of the bearing portion 23. A seal gap 47 is defined between the inner circumferential surface of the cylindrical seal portion 282 and the outer circumferential surface of the sleeve housing 232. A seal portion 47a, which has a surface of the lubricating oil 40 defined therein, is defined in the seal gap 47. In the present preferred embodiment, the cylindrical seal portion 282 centered on the central axis J1 corresponds to a second tubular portion.

The cup portion 29 includes a cup inner wall portion 291, a cup top plate portion 292, and a cup outer wall portion 293. The cup inner wall portion 291, the cup top plate portion 292, and the cup outer wall portion 293 are defined by a single continuous member.

The cup inner wall portion 291 is substantially cylindrical and centered on the central axis J1. The cup top plate portion 292 is arranged to extend radially outward from an upper end portion of the cup inner wall portion 291. The cup top plate portion 292 is substantially in the shape of a disk and centered on the central axis J1. The cup outer wall portion 293 is arranged to extend downward from an outer edge portion of the cup top plate portion 292. The cup outer wall portion 293 is substantially cylindrical and centered on the central axis J1.

An inner circumferential surface of the cup inner wall portion 291 is fixed to an outer circumferential surface of the cylindrical seal portion 282. The central rotating portion 28 is inserted in the cup portion 29. The central rotating portion 28 and the cup portion 29 are fixed to each other through adhesion or both adhesion and press fit. The outer circumferential surface of the cylindrical seal portion 282 includes a raised portion 283 arranged to project radially outward. A lower end of the cup inner wall portion 291 is arranged to be in contact with an upper surface of the raised portion 283.

A lower end portion of the cylindrical seal portion 282 is arranged opposite to the upper surface of the bushing body portion 241 in the vertical direction. The outer circumferential surface of the cylindrical seal portion 282 is arranged radially opposite an inner circumferential surface of the bushing projecting portion 242 below the raised portion 283. The bushing projecting portion 242 is a radially opposing portion arranged radially opposite the cylindrical seal portion 282.

An upper end surface of the bushing projecting portion 242 and a lower surface of the raised portion 283 are arranged opposite to each other in the vertical direction. Both the bushing projecting portion 242 and the cup inner wall portion 291 are arranged radially between the cylindrical seal portion 282 and the stator 210. An annular minute horizontal gap 491 extending radially is defined between the upper end surface of the bushing projecting portion 242 and the lower surface of the raised portion 283. In other words, the bushing projecting portion 242 and the raised portion 283 are arranged opposite to each other in the vertical direction with the horizontal gap 491 intervening therebetween. The vertical dimension of the horizontal gap 491 is preferably arranged in the range of about 0.1 mm to about 0.5 mm.

An annular minute vertical gap 492 extending in the vertical direction is defined between the inner circumferential surface of the bushing projecting portion 242 and the outer circumferential surface of the cylindrical seal portion 282. The vertical gap 492 is continuous with an inner circumferential portion of the horizontal gap 491, and is arranged to extend downward from the horizontal gap 491. An annular minute intermediate gap 493 is defined between the lower end portion of the cylindrical seal portion 282 and the upper surface of the bushing body portion 241. The intermediate gap 493 is continuous with both a lower end portion of the vertical gap 492 and a lower end portion of the seal gap 47. In other words, the intermediate gap 493 is arranged to join the lower end portion of the vertical gap 492 and the lower end portion of the seal gap 47 to each other.

The horizontal gap 491, the vertical gap 492, and the intermediate gap 493 are arranged to together define a labyrinth structure radially outside the seal gap 47. This contributes to preventing an air including the lubricating oil 40 evaporated from the seal gap 47 from traveling out of the bearing mechanism 4. As a result, a reduction in evaporation of the lubricating oil 40 out of the bearing mechanism 4 is achieved. In addition, an increase in the vertical dimension of the labyrinth structure is achieved by the upper end of the bushing projecting portion 242 being arranged at a level higher than that of the upper end of the core back 213.

The yoke 261 is substantially cylindrical and centered on the central axis J1. The yoke 261 is fixed to an inner circumferential surface of the cup outer wall portion 293. The rotor magnet 262 is substantially cylindrical and centered on the central axis J1, and is fixed to an inner circumferential surface of the yoke 261. In other words, the rotor magnet 262 is indirectly fixed to the inner circumferential surface of the cup outer wall portion 293 through the yoke 261. The rotor magnet 262 is arranged radially outside the stator 210.

Referring to FIG. 1, the blades 31 are directly fixed to an outer circumferential surface of the cup outer wall portion 293. Note that the blades 31 may be indirectly fixed to the outer circumferential surface of the cup outer wall portion 293 through another member such as a blade support portion.

Figure 3:
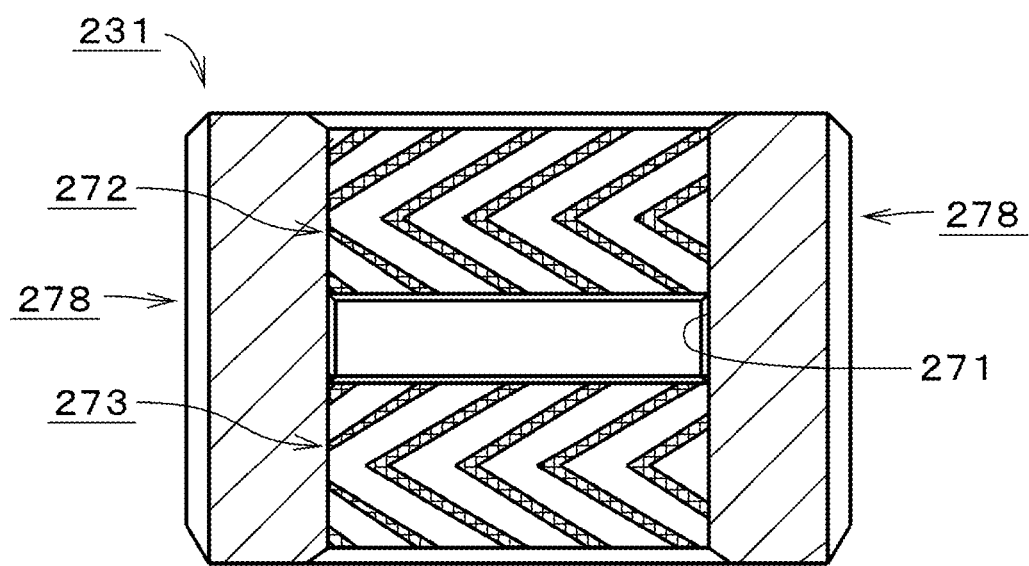
FIG. 3 is a vertical cross-sectional view of a sleeve according to the above preferred embodiment.
Figure 4:
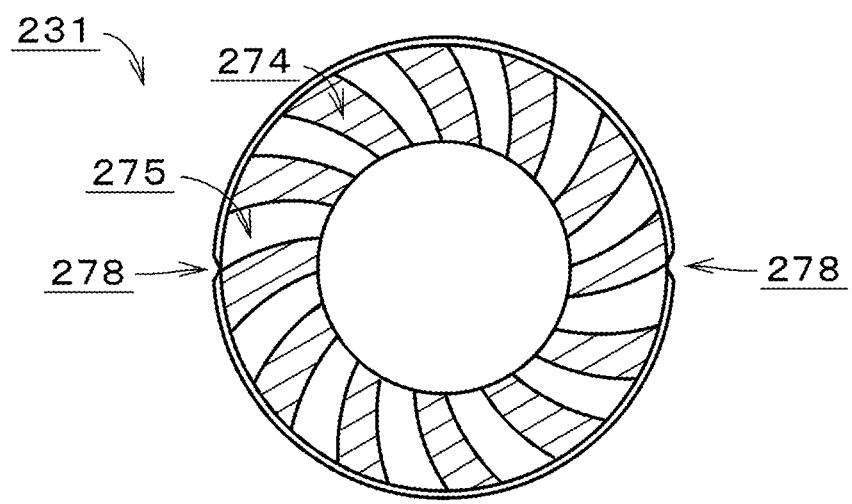
FIG. 4 is a plan view of the sleeve.
Figure 5:
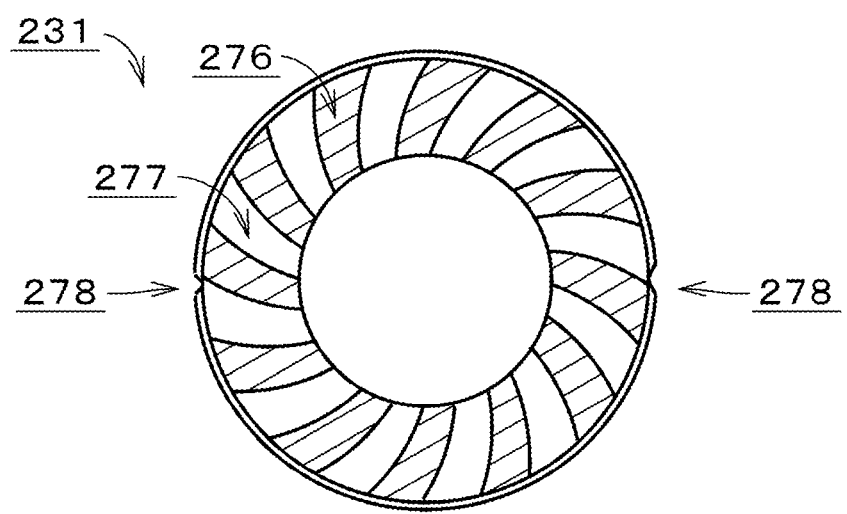
FIG. 5 is a bottom view of the sleeve.

FIG. 3 is a vertical cross-sectional view of the sleeve 231. An upper portion and a lower portion of an inner circumferential surface 271 of the sleeve 231 include a first radial dynamic pressure groove array 272 and a second radial dynamic pressure groove array 273, respectively. Each of the first and second radial dynamic pressure groove arrays 272 and 273 is made up of a plurality of grooves arranged in a herringbone pattern. FIG. 4 is a plan view of the sleeve 231. An upper surface 274 of the sleeve 231 includes a first thrust dynamic pressure groove array 275 made up of a plurality of grooves arranged in a spiral pattern. FIG. 5 is a bottom view of the sleeve 231. A lower surface 276 of the sleeve 231 includes a second thrust dynamic pressure groove array 277 arranged in a spiral pattern.

Note that each of the first and second radial dynamic pressure groove arrays 272 and 273 may be defined in an outer circumferential surface of the shaft 251. Also note that the first thrust dynamic pressure groove array 275 may be defined in a region of a lower surface of the bearing opposing portion 281 which is opposed to the upper surface 274 of the sleeve 231. Also note that the second thrust dynamic pressure groove array 277 may be defined in the upper surface of the plate portion 256. Also note that the first thrust dynamic pressure groove array 275 may be made up of a collection of grooves arranged in a herringbone pattern. Also note that the second thrust dynamic pressure groove array 277 may also be made up of a collection of grooves arranged in a herringbone pattern.

Figure 6:
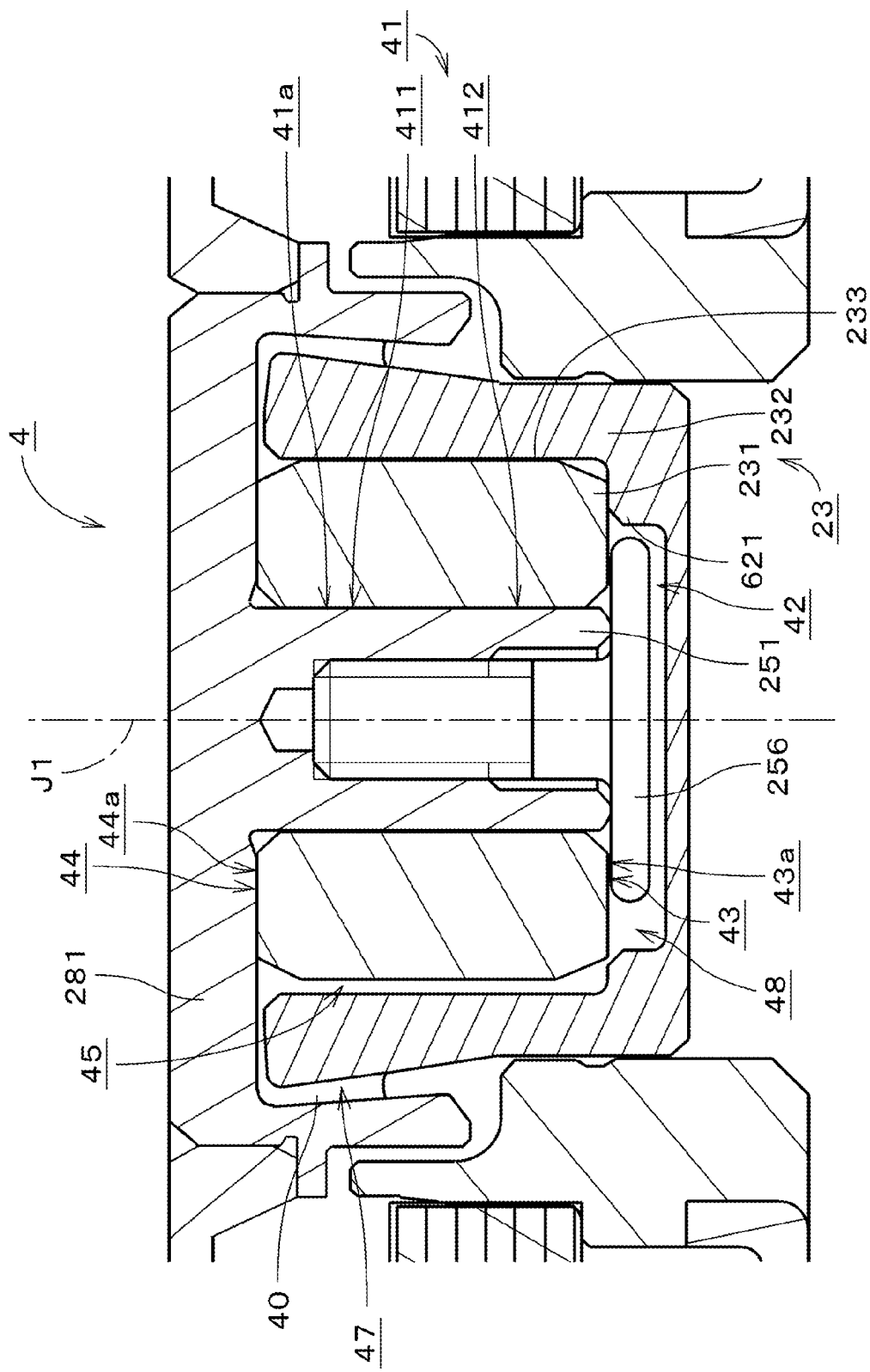
FIG. 6 is a vertical cross-sectional view of a bearing portion and its vicinity according to the above preferred embodiment.

FIG. 6 is a vertical cross-sectional view of the bearing portion 23 and its vicinity. A lower gap 42 is defined between the plate portion 256 and the sleeve housing 232. The lubricating oil 40 is arranged in the lower gap 42. A plate surrounding space 48 is defined between a side surface of the plate portion 256 and an inside surface of a bottom portion of the sleeve housing 232. The lubricating oil 40 exists in the plate surrounding space 48. A second thrust gap 43 is defined between the lower surface of the sleeve 231 and the upper surface of the plate portion 256. The lubricating oil 40 is arranged in the second thrust gap 43. The second thrust gap 43 is arranged to define a second thrust dynamic pressure bearing portion 43a arranged to generate a fluid dynamic pressure in the lubricating oil 40. The plate surrounding space 48 enables the lubricating oil 40 to exist continuously from an outer circumferential portion of the second thrust gap 43 to an outer circumferential portion of the lower gap 42.

A radial gap 41 is defined between the outer circumferential surface of the shaft 251 and the inner circumferential surface of the sleeve 231. A lower end portion of the radial gap 41 is continuous with an inner circumferential portion of the second thrust gap 43. The radial gap 41 includes a first radial gap 411 and a second radial gap 412 arranged below the first radial gap 411.

The first radial gap 411 is defined between the outer circumferential surface of the shaft 251 and a portion of the inner circumferential surface of the sleeve 231 in which the first radial dynamic pressure groove array 272 illustrated in FIG. 3 is defined. Meanwhile, the second radial gap 412 is defined between the outer circumferential surface of the shaft 251 and a portion of the inner circumferential surface of the sleeve 231 in which the second radial dynamic pressure groove array 273 is defined. The lubricating oil 40 is arranged in the radial gap 41. The first and second radial gaps 411 and 412 are arranged to together define a radial dynamic pressure bearing portion 41a arranged to generate a fluid dynamic pressure in the lubricating oil 40. That is, the radial dynamic pressure bearing portion 41a is defined between the shaft 251 and the sleeve 231. The shaft 251 is radially supported by the radial dynamic pressure bearing portion 41a.

A first thrust gap 44 is defined between an upper surface of the bearing portion 23 and the lower surface of the bearing opposing portion 281. The first thrust gap 44 is arranged to extend radially outward from an upper end portion of the radial gap 41. The lubricating oil 40 is arranged in the first thrust gap 44. A first thrust dynamic pressure bearing portion 44a arranged to generate a fluid dynamic pressure in the lubricating oil 40 is defined in a region of the first thrust gap 44 in which the first thrust dynamic pressure groove array 275 illustrated in FIG. 4 is defined. That is, a gap defined between the upper surface 274 of the sleeve 231 and the lower surface of the bearing opposing portion 281 is arranged to define the first thrust dynamic pressure bearing portion 44a arranged to generate the fluid dynamic pressure in the lubricating oil 40.

The bearing opposing portion 281 is axially supported by both the first and second thrust dynamic pressure bearing portions 44a and 43a. Provision of the first and second thrust dynamic pressure bearing portions 44a and 43a contributes to reducing a variation in vertical play of the shaft 251. The aforementioned seal gap 47 is arranged to extend downward from an outer circumferential portion of the first thrust gap 44.

Circulation channels 45 are defined between the outer circumferential surface of the sleeve 231 and the inner circumferential surface of the sleeve housing 232. Each circulation channel 45 is arranged to cause an outer circumferential portion of the first thrust dynamic pressure bearing portion 44a and an outer circumferential portion of the second thrust dynamic pressure bearing portion 43a to be in communication with each other.

In the motor portion 2, the seal gap 47, the first thrust gap 44, the radial gap 41, the second thrust gap 43, the plate surrounding space 48, the lower gap 42, and the circulation channels 45 are arranged to together define a single continuous bladder structure, and the lubricating oil 40 is arranged continuously in this bladder structure. Within the bladder structure, the surface of the lubricating oil 40 is defined only in the seal gap 47, which is located between the inner circumferential surface of the cylindrical seal portion 282 and the outer circumferential surface of the bearing portion 23. The bladder structure contributes to easily preventing a leakage of the lubricating oil 40.

The bearing mechanism 4 of the motor portion 2 includes the shaft 251, the sleeve 231, the sleeve housing 232, the adhesive 233, the plate portion 256, the bearing opposing portion 281, the cylindrical seal portion 282, and the aforementioned lubricating oil 40. In the bearing mechanism 4, the shaft 251, the plate portion 256, the bearing opposing portion 281, and the cylindrical seal portion 282 are arranged to rotate about the central axis J1 relative to the bearing portion 23 through the lubricating oil 40.

In the motor portion 2 illustrated in FIG. 1, a current is supplied to the stator 210 to produce a torque centered on the central axis J1 between the rotor magnet 262 and the stator 210. This causes the blades 31 of the impeller 3 to rotate about the central axis J1 together with the rotating portion 22. Rotation of the impeller 3 caused by the motor portion 2 causes an air to be drawn into the housing 5 through the air inlets 54 and sent out through the air outlet.

Regarding the blower fan 1, in the case where the central rotating portion 28 is defined by subjecting the metal to the cutting process, precision with which the central rotating portion 28 is shaped is improved. This enables each of the radial dynamic pressure bearing portion 41a, the first thrust dynamic pressure bearing portion 44a, the second thrust dynamic pressure bearing portion 43a, and the seal gap 47 to be defined with high precision. In the case where the cup portion 29 is made of the resin, a reduction in the weight of the rotating portion 22 is achieved. As a result, a reduction in the power consumption of the blower fan 1 is achieved.

Figure 7:
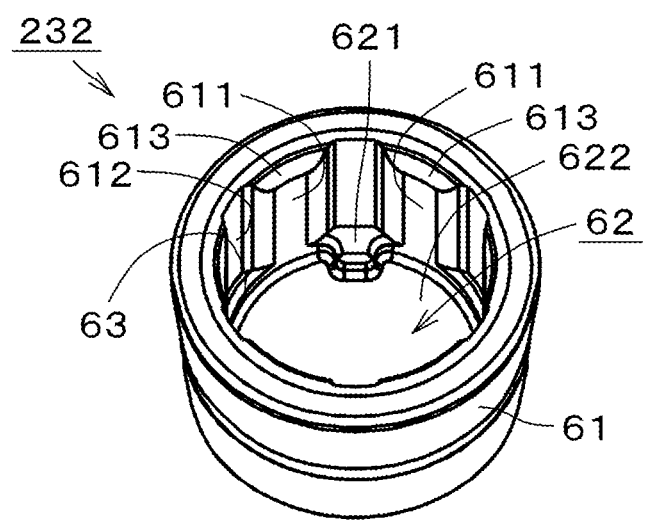
FIG. 7 is a perspective view of a sleeve housing according to the above preferred embodiment.
Figure 8:
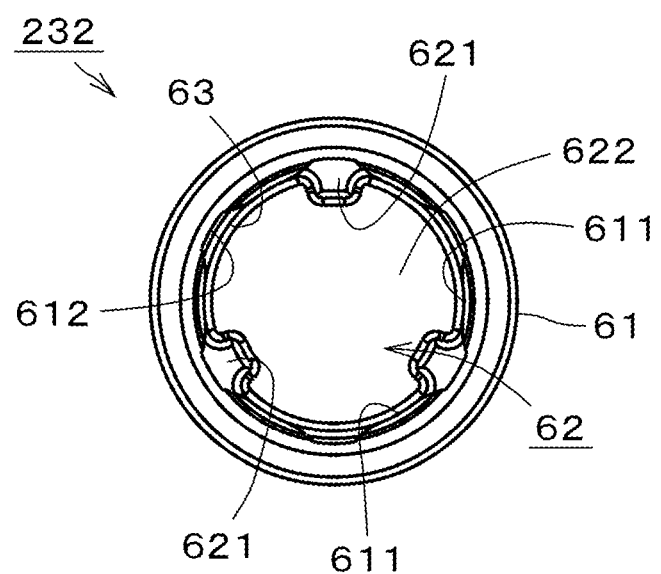
FIG. 8 is a plan view of the sleeve housing.
Figure 9:
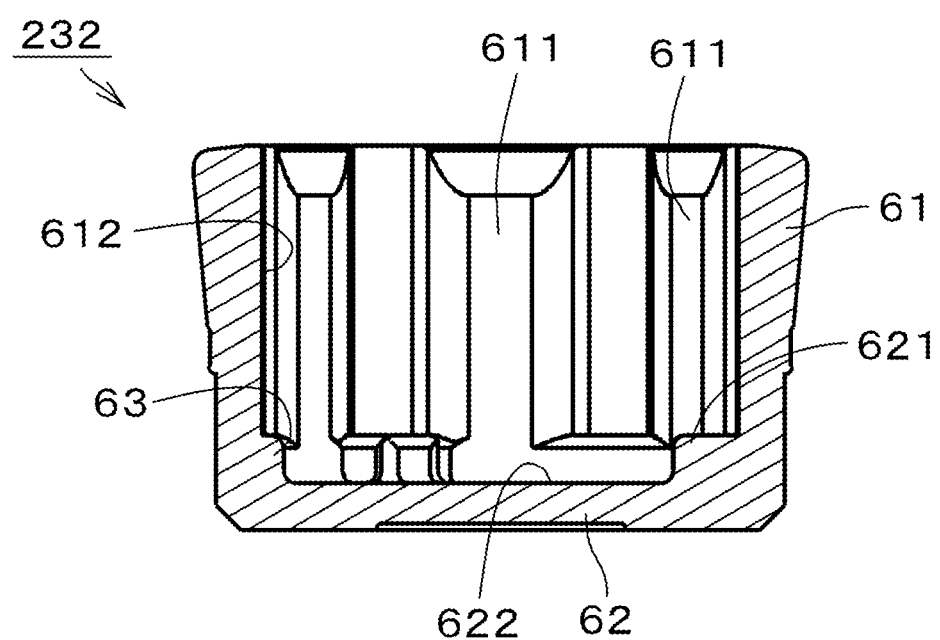
FIG. 9 is a vertical cross-sectional view of the sleeve housing.

FIG. 7 is a perspective view of the sleeve housing 232. FIG. 8 is a plan view of the sleeve housing 232. FIG. 9 is a vertical cross-sectional view of the sleeve housing 232.

The sleeve housing 232 includes a cylindrical portion 61 and a bottom portion 62. The cylindrical portion 61 is substantially cylindrical. In the present preferred embodiment, the cylindrical portion 61 centered on the central axis J1 corresponds to a first tubular portion. The bottom portion 62 is arranged to close a lower portion of the cylindrical portion 61. The cylindrical portion 61 is arranged to cover outer circumferences of the sleeve 231 and the plate portion 256. The bottom portion 62 includes a plurality of projecting portions 621. The projecting portions 621 are arranged in the circumferential direction in an upper surface 622 of the bottom portion 62. In FIG. 8, the number of projecting portions 621 is three. Each projecting portion 621 is arranged to project upward from the upper surface 622 of the bottom portion 62. As illustrated in FIG. 6, an upper end surface of each projecting portion 621 is arranged to be in contact with the lower surface of the sleeve 231. The distance between the upper surface 622 of the bottom portion 62 and the lower surface of the sleeve 231, that is, the height of a space arranged to accommodate the plate portion 256, is thereby determined. In addition, the plate portion 256 is arranged radially opposite each of the projecting portions 621. A space surrounded by the sleeve 231, the plate portion 256, and a lower portion of the sleeve housing 232 including the projecting portions 621 is the plate surrounding space 48.

The cylindrical portion 61 includes a plurality of contact portions 611. The contact portions 611 are arranged in the circumferential direction in an inner circumference of the cylindrical portion 61. Each contact portion 611 is arranged to extend in an axial direction. Each contact portion 611 is arranged to project radially inward in the inner circumference of the cylindrical portion 61. The contact portion 611 is arranged to be in contact with the outer circumferential surface of the sleeve 231. In FIG. 8, the contact portions 611 arranged in the circumferential direction are six in number, while the projecting portions 621, numbering three, are arranged in alternate locations between the contact portions 611. As illustrated in FIG. 7, an upper end of each contact portion 611 includes an inclined surface 613 arranged to be inclined upward with increasing distance from the central axis J1. This makes it easier to insert the sleeve 231 into the sleeve housing 232. Between the sleeve 231 and the sleeve housing 232, spaces are defined between the contact portions 611. Each of these spaces corresponds to one of the circulation channels 45 illustrated in FIG. 6.

As mentioned above, the sleeve 231 and the sleeve housing 232 are adhered to each other through the adhesive 233. That is, an adhesive layer is arranged to intervene between the sleeve 231 and each contact portion 611. The adhesive 233 is applied onto each contact portion 611 before the sleeve 231 is inserted into the sleeve housing 232. At least a portion of the adhesive 233 is arranged to exist between the outer circumferential surface of the sleeve 231 and an inner circumferential surface 612 of the cylindrical portion 61. The "inner circumferential surface 612" here refers to a surface of each contact portion 611 and inner surfaces of portions of the cylindrical portion 61 between the contact portions 611. Provision of the contact portions 611 contributes to improving strength with which the sleeve 231 and the sleeve housing 232 are adhered to each other. In the present preferred embodiment, a radially inner surface of each contact portion 611 is arranged to have a radius of curvature substantially the same as that of the outer circumferential surface of the sleeve 231. Note that the radially inner surface of the contact portion 611 may be flat or be arranged to project radially inward. Also note that the radially inner surface of the contact portion 611 may be a portion of a cylindrical surface having a radius of curvature greater than that of the outer circumferential surface of the sleeve 231.

Preferably, the sleeve 231 is inserted in the sleeve housing 232 while being press fitted thereto. Provision of the contact portions 611 spaced from one another makes it easier to press fit the sleeve 231 to the sleeve housing 232. Moreover, the press fitting of the sleeve 231 to the sleeve housing 232 is also made easier by the sleeve housing 232 being made of the resin. In the case where the sleeve housing 232 is made of the resin, a reduction in a production cost of the sleeve housing 232, which includes the projecting portions 621, is achieved. A gate mark resulting from molding of the sleeve housing 232 is located at a center of a lower surface of the bottom portion 62 of the sleeve housing 232.

Because the projecting portions 621 are spaced from one another in the circumferential direction, an adhesive held in a gap between the lower surface of the sleeve 231 and the upper end surface of any projecting portion 621 would enter into the space between the projecting portion 621 and an adjacent one of the projecting portions 621. Therefore, a reduction in a decrease in accuracy of the axial position of the sleeve 231 relative to the sleeve housing 232 is easily achieved compared to the case where a single annular projecting portion is provided instead of the projecting portions 621 spaced from one another in the circumferential direction. Moreover, management of a process when the sleeve 231 is inserted into the sleeve housing 232 is made easier. The contact portions 611 and the projecting portions 621 are arranged at different circumferential positions, and this contributes to preventing the adhesive from flowing into a gap above any projecting portion 621.

Furthermore, in the case where the single annular projecting portion is provided, there is a possibility that a superfluous adhesive will flow toward the plate portion 256. The bearing mechanism 4 illustrated in FIG. 6 is able to significantly reduce the probability that such a problem will occur. Prevention of inward entry of the adhesive is particularly suitable for a bearing mechanism in which any thrust dynamic pressure bearing portion is defined between the lower surface of the sleeve 231 and the upper surface of the plate portion 256.

Each projecting portion 621 is arranged to be radially continuous with the inner circumferential surface 612 of the cylindrical portion 61. That is, the projecting portion 621 is arranged to define a shoulder at a junction of the cylindrical portion 61 and the bottom portion 62. Both circumferential side portions of the projecting portion 621 are arranged to be continuous with the adjacent contact portions 611, while other portions of the projecting portion 621 are located in a region between the two contact portions 611. This results in improved flexural rigidity of the sleeve housing 232 at the junction of the cylindrical portion 61 and the bottom portion 62.

Meanwhile, the sleeve housing 232 further includes shoulder portions 63 independently of the projecting portions 621. Each shoulder portion 63 is located at a junction of the inner circumferential surface 612 of the cylindrical portion 61 and the upper surface 622 of the bottom portion 62. Each shoulder portion 63 is located circumferentially between adjacent ones of the contact portions 611. The shoulder portion 63 is arranged radially outward of a radially innermost position of each projecting portion 621. The shoulder portions 63 are arranged to extend in an annular shape in the circumferential direction except in regions where the contact portions 611 exist. The shoulder portions 63 may be considered to extend in a completely annular shape in the circumferential direction, because radially inner surfaces of the shoulder portions 63 and the radially inner surfaces of the contact portions 611 are arranged to be circumferentially continuous with one another. Note that an annular shoulder portion 63 extending in the circumferential direction may be provided, with a radially inner surface of the shoulder portion 63 being arranged radially inward of the radially inner surface of each contact portion 611. Each aforementioned shape of the shoulder portion(s) 63 makes it easy to manufacture a mold for molding the sleeve housing 232. The axial position of an upper surface of each shoulder portion 63 is arranged to be the same as that of an upper surface of each projecting portion 621. This also makes it easy to manufacture the mold for molding the sleeve housing 232.

Referring to FIG. 6, each shoulder portion 63 is arranged to be out of contact with the sleeve 231. This enables each circulation channel 45 to be in communication with the plate surrounding space 48. The circulation channels 45, the first thrust gap 44, the radial gap 41, and the second thrust gap 43 combine to enable circulation of the lubricating oil 40. The lubricating oil 40 may be arranged to circulate in any direction. The shoulder portions 63 contribute to improving the flexural rigidity of the sleeve housing 232 at the junction of the cylindrical portion 61 and the bottom portion 62 made of the resin while allowing the circulation of the lubricating oil 40.

Note that, regardless of presence or absence of the shoulder portions 63, a channel through which the lubricating oil 40 circulates is easily secured when the sleeve housing 232 is arranged to include no projecting portion 621 in at least one of the spaces circumferentially between the contact portions 611.

Referring to FIGS. 3 to 5, grooves 278 each of which is arranged to extend in the axial direction are defined in the outer circumferential surface of the sleeve 231. Each of the grooves 278 also defines a circulation channel arranged to cause the first and second thrust gaps 44 and 43 to be in communication with each other.

Referring to FIG. 6, an outer edge portion of a lower end of the sleeve 231 has a chamfered shape. This enables each shoulder portion 63 to be easily out of contact with the sleeve 231. This makes it possible to arrange the radial position of an outermost circumferential surface of a lower portion of the sleeve 231 to be the same as the radially innermost position of the shoulder portion 63, or to be radially outward of the radially innermost position of the shoulder portion 63. In addition, an increase in the radial width of the shoulder portion 63 is made possible. The "outermost circumferential surface of the lower portion" of the sleeve 231 here refers to an outermost circumferential surface of the lower portion of the sleeve 231 excluding the chamfer portion.

Figure 10:
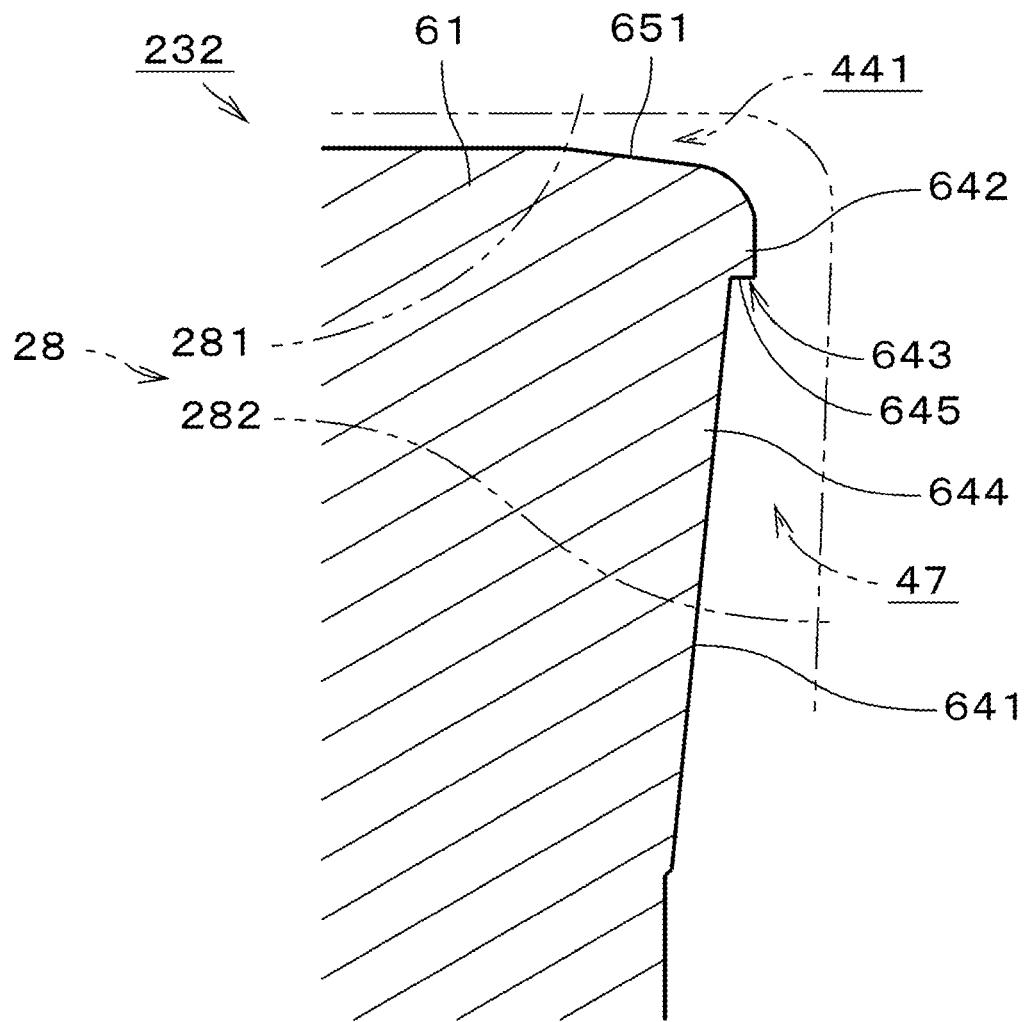
FIG. 10 is a cross-sectional view illustrating an upper portion of the sleeve housing in an enlarged form.

FIG. 10 is a cross-sectional view illustrating a radially outer portion of an upper portion of the cylindrical portion 61 of the sleeve housing 232 in an enlarged form. In FIG. 10, a section of the cylindrical portion 61 taken on a plane including the central axis J1 is shown. The cylindrical portion 61 includes a maximum outside diameter portion 642, an annular shoulder portion 643, and an inclined portion 644. The maximum outside diameter portion 642 is arranged in the vicinity of an upper end of the cylindrical portion 61. The cylindrical portion 61 is arranged to have the greatest outside diameter at the maximum outside diameter portion 642. The maximum outside diameter portion 642 includes only a portion of the cylindrical portion 61 which has the greatest outside diameter. The maximum outside diameter portion 642 is arranged to extend over a minute area in the axial direction. That is, an outer circumferential surface 641 of the cylindrical portion 61 includes a cylindrical portion which extends parallel to the axial direction and at which the cylindrical portion 61 has the greatest outside diameter.

The annular shoulder portion 643 is a portion of the cylindrical portion 61 which has an outside diameter smaller than that of the maximum outside diameter portion 642 and which is arranged below the maximum outside diameter portion 642. The annular shoulder portion 643 includes a surface 645 continuous with an outer circumferential surface of the maximum outside diameter portion 642 and facing downward. In other words, the outer circumferential surface 641 of the cylindrical portion 61 includes a line which joins the maximum outside diameter portion 642 and the annular shoulder portion 643 to each other. The surface 645 is an annular surface substantially centered on the central axis J1. Ideally, the surface 645 is arranged to extend perpendicularly to the axial direction. As described below, the surface 645 is defined by an annular corner portion of a lower mold when the sleeve housing 232 is produced by using an upper mold and the lower mold. In the case where this corner portion of the lower mold is worn, the surface 645 of the annular shoulder portion 643 is shaped in accordance with the worn corner portion.

The inclined portion 644 is a portion of the cylindrical portion 61 at which the outside diameter of the cylindrical portion 61 is arranged to gradually decrease with decreasing height from the annular shoulder portion 643. The wording "to gradually decrease in size" as used herein means to substantially gradually decrease in size, and a portion which "gradually decreases in size" may include a minute portion which has a constant size or the like. The same is true of the wording "to gradually increase in size". An outer circumferential surface of the inclined portion 644 is continuous with the aforementioned surface 645 of the annular shoulder portion 643. The seal portion 47a described above with reference to FIG. 2 is defined between the inner circumferential surface of the cylindrical seal portion 282 and the inclined portion 644. That is, at the inclined portion 644, the outside diameter of the cylindrical portion 61 is arranged to gradually decrease toward the surface of the lubricating oil 40.

The inner circumferential surface of the cylindrical seal portion 282, which is represented by a chain double-dashed line in FIG. 10, is arranged to gradually decrease in diameter with decreasing height. In a section of the motor portion 2 taken on the plane including the central axis J1, an angle of inclination of the inner circumferential surface of the cylindrical seal portion 282 with respect to the axial direction is arranged to be smaller than an angle of inclination of the outer circumferential surface of the inclined portion 644 with respect to the axial direction. The above relationship causes the width of the seal gap 47 between the cylindrical seal portion 282 and the inclined portion 644 to gradually increase with decreasing height. As described above, the surface of the lubricating oil 40 is defined at a position abutting on the inclined portion 644. Thus, the maximum outside diameter portion 642, the annular shoulder portion 643, and the inclined portion 644 are arranged in an area where the outer circumferential surface 641 of the cylindrical portion 61 is in contact with the lubricating oil 40.

An annular slanting surface 651 arranged to gradually increase in diameter with decreasing height is arranged at an outer edge portion of an upper surface of the cylindrical portion 61. The annular slanting surface 651 is continuous with the outer circumferential surface of the maximum outside diameter portion 642. As described above with reference to FIG. 6, the first thrust dynamic pressure bearing portion 44a is defined in the first thrust gap 44 between the upper surface of the bearing portion 23 and the lower surface of the bearing opposing portion 281. An outer edge gap 441 is defined between the lower surface of the bearing opposing portion 281, which is represented by a chain double-dashed line in FIG. 10, and the annular slanting surface 651. The outer edge gap 441 is a portion of the first thrust gap 44, and is continuous with the seal gap 47. The width of the outer edge gap 441 is arranged to gradually increase in a radially outward direction, i.e., toward the seal gap 47. Actually, the width of an entire gap made up of the outer edge gap 441 and the seal gap 47 is arranged to gradually increase toward the surface of the lubricating oil 40.

Figure 11:
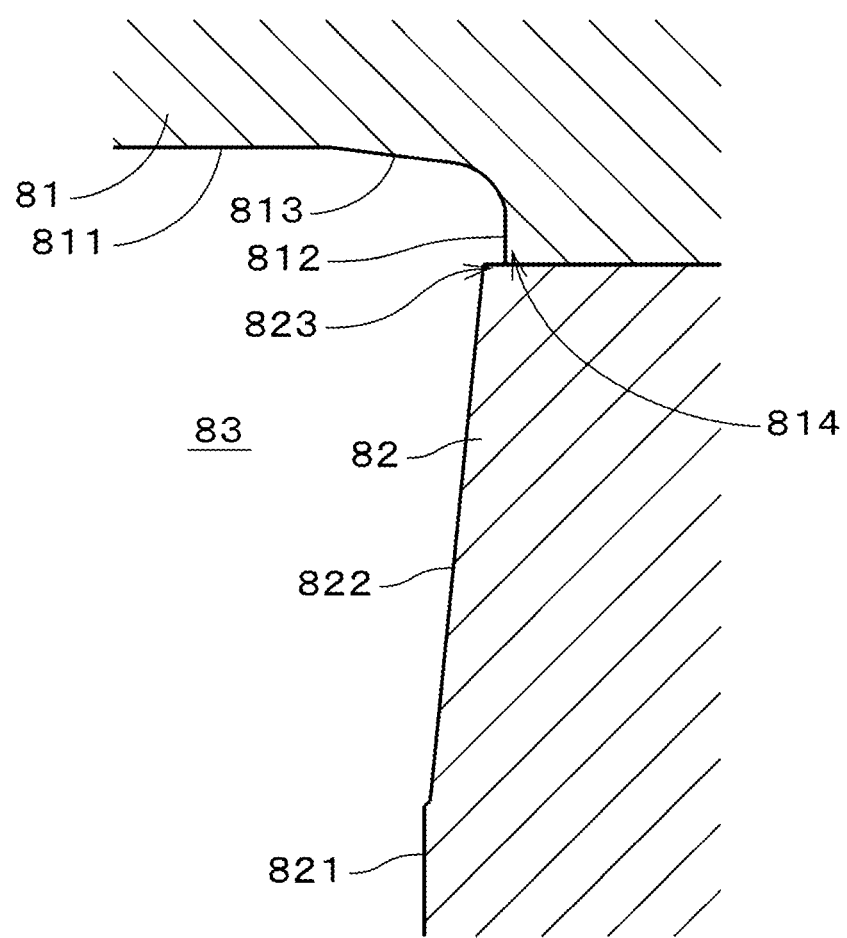
FIG. 11 is a vertical cross-sectional view of an upper mold and a lower mold according to the above preferred embodiment.

Next, production of the sleeve housing 232 will now be described below. In the production of the sleeve housing 232, molds which can be separated from each other in the axial direction are used. FIG. 11 is a diagram illustrating portions of sections of an upper mold 81 and a lower mold 82 taken on the plane including a central axis. In FIG. 11, portions of the upper mold 81 and the lower mold 82 which are used to mold the maximum outside diameter portion 642, the annular shoulder portion 643, and the inclined portion 644 of the cylindrical portion 61 are shown. The central axis of each of the upper and lower molds 81 and 82 coincides with the central axis J1 of the sleeve housing 232, which is molded by using the upper and lower molds 81 and 82. For example, the upper mold 81 is a movable mold, while the lower mold 82 is a fixed mold.

The lower mold 82 is substantially cylindrical and has a bottom. An inner circumferential surface 821 of the lower mold 82 includes an inclined surface 822 having the same shape as that of the outer circumferential surface of the inclined portion 644 of the cylindrical portion 61. The upper mold 81 is in the shape of a lid, and is arranged to close an opening of the lower mold 82. An inner surface 811 of the upper mold 81 includes a maximum inside diameter surface 812 having the same shape as that of the outer circumferential surface of the maximum outside diameter portion 642 of the cylindrical portion 61, and an annular slanting surface 813 having the same shape as that of the annular slanting surface 651 of the cylindrical portion 61. Actually, the upper mold 81 also includes a portion used to mold both the inner circumferential surface and the inner bottom surface of the sleeve housing 232. The maximum inside diameter surface 812 of the upper mold 81 is arranged radially outward of an upper end of the inclined surface 822 of the lower mold 82, at which the lower mold 82 has the greatest inside diameter. That is, a corner portion 823 including an upper end of the inner circumferential surface 821 of the lower mold 82 is arranged radially inward of a corner portion 814 including a lower end of the maximum inside diameter surface 812 of the upper mold 81. The annular shoulder portion 643 of the cylindrical portion 61 is molded by the corner portion 823 of the lower mold 82.

In the production of the sleeve housing 232 using the upper and lower molds 81 and 82, a resin is injected into an interior space 83 defined by the upper and lower molds 81 and 82 through a gate defined in a bottom portion of the lower mold 82. Then, after the resin is cured in the interior space 83, the upper and lower molds 81 and 82 are separated from each other in the axial direction, and the molded sleeve housing 232 is removed therefrom. A shoulder defined along a boundary between the upper and lower molds 81 and 82 prior to the separation, i.e., a parting line, becomes the annular shoulder portion 643 of the sleeve housing 232. A mark of the gate used in the molding is defined in a center of the lower surface of the bottom portion 62 of the sleeve housing 232. Note that a plurality of gates may be defined in the bottom portion of the lower mold 82.

Figure 12:
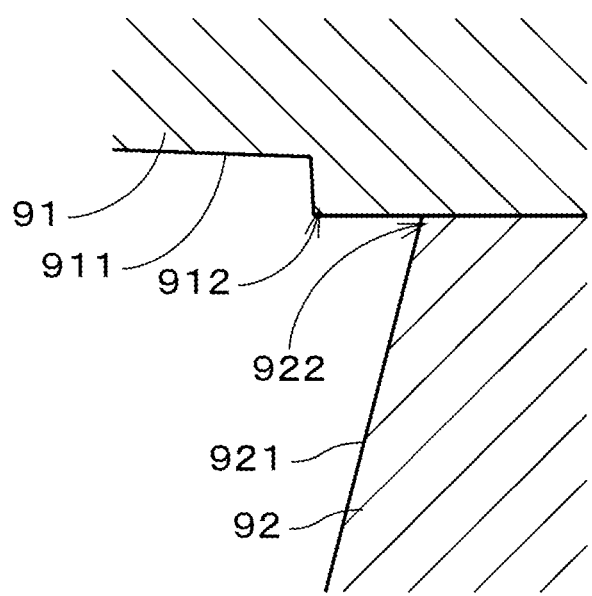
FIG. 12 is a vertical cross-sectional view of an upper mold and a lower mold according to a comparative example.

Here, molds according to a comparative example will be described below. FIG. 12 is a diagram illustrating an upper mold 91 and a lower mold 92 as the molds according to the comparative example. In general, in view of ease of flow of a resin, molds are designed such that the resin will flow from a space having a greater width to a space having a smaller width. Referring to FIG. 12, when this design concept is reflected in the molds used to mold the sleeve housing, a corner portion 922 including an upper end of an inner circumferential surface 921 of the lower mold 92 is arranged radially outward of a corner portion 912 including a lower end of an inner surface 911 of the upper mold 91.

Figure 13:
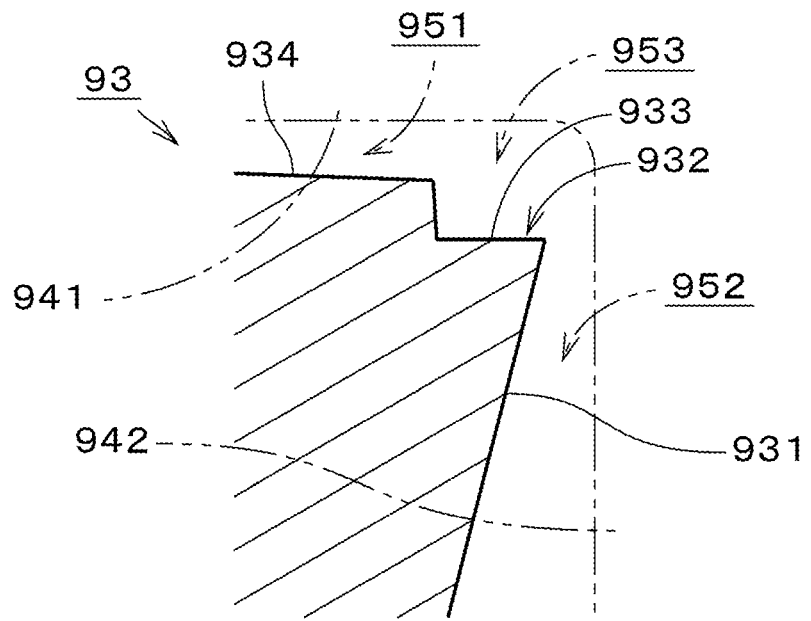
FIG. 13 is a cross-sectional view illustrating an upper portion of a sleeve housing according to the comparative example in an enlarged form.

FIG. 13 is a cross-sectional view illustrating a portion of a sleeve housing 93 produced by using the molds according to the comparative example. The sleeve housing 93 is arranged to have the greatest outside diameter at an upper end of an inclined portion 931. An annular shoulder portion 932, which is a parting line, includes a surface 933 facing upward. A shoulder is defined between this surface 933 and an annular slanting surface 934 in an upper end surface of the sleeve housing 93. The width of an outer edge gap 951 defined between a bearing opposing portion 941, which is represented by a chain double-dashed line in FIG. 13, and the annular slanting surface 934 is arranged to gradually increase in the radially outward direction. The width of a seal gap 952 defined between a cylindrical seal portion 942, which is represented by a chain double-dashed line in FIG. 13, and the inclined portion 931 is arranged to gradually increase with decreasing height. A surface of a lubricating oil is located in the seal gap 952.

However, a gap 953 having a width greater than that of the seal gap 952 at the upper end of the inclined portion 931 is defined between the outer edge gap 951 and the seal gap 952. Therefore, in a path leading from the outer edge gap 951 to the seal gap 952, the width of the gap suddenly narrows at the upper end of the inclined portion 931. This hinders any air bubble in the lubricating oil in the gap 953 from moving into the seal gap 952, making it likely for the air bubble to stay in the gap 953. Moreover, depending on the shape of the gap 953, a surface of the lubricating oil may be defined in the gap 953 when the lubricating oil is injected through the seal gap 952, making it difficult for the lubricating oil to be injected into a bearing mechanism.

In contrast, in the case of the sleeve housing 232 illustrated in FIG. 10, the annular shoulder portion 643, which includes the surface 645 facing toward the surface of the lubricating oil 40, is arranged as the parting line below the maximum outside diameter portion 642. Thus, in a path leading from the outer edge gap 441 to the seal gap 47, the width of the gap is prevented from suddenly narrowing in the vicinity of the maximum outside diameter portion 642. As a result, the likelihood that any air bubble in the lubricating oil 40 will stay in the vicinity of the maximum outside diameter portion 642 is reduced. Note that, although the upper and lower molds 81 and 82 illustrated in FIG. 11 allow the resin to flow from a space having a smaller width to a space having a greater width, a difference between the widths of the two spaces is only slight, and a problem in flow of the resin does not occur.

Moreover, the annular slanting surface 651 arranged to gradually increase in diameter with decreasing height is arranged at the outer edge portion of the upper surface of the cylindrical portion 61. A combination of the annular slanting surface 651, the maximum outside diameter portion 642, the annular shoulder portion 643, and the inclined portion 644 causes the width of a gap defined between the outer circumferential surface 641 and the outer edge portion of the upper surface of the cylindrical portion 61 and the central rotating portion 28 to gradually increase toward the surface of the lubricating oil 40. This facilitates travel of any air bubble in the lubricating oil 40 to the surface of the lubricating oil 40 and discharge of the air bubble.

The radial protrusion of the annular shoulder portion 643 is preferably arranged to have a width greater than half the width of the first thrust gap 44 or of the second thrust gap 43. Arranging the radial protrusion of the annular shoulder portion 643 to have a relatively great width as described above contributes to more securely preventing an upward facing surface from being defined in the annular shoulder portion as in the sleeve housing 93 according to the comparative example. The radial protrusion of the annular shoulder portion 643 is preferably arranged to have a width of 70 µm or less. This prevents an excessive change in the width of the seal gap 47. More preferably, the radial protrusion of the annular shoulder portion 643 is arranged to have a width of 50 µm or less.

The sleeve housing 232 may be made of an aluminum alloy or the like and molded by die casting using the upper and lower molds 81 and 82. That is, in the bearing mechanism 4 illustrated in FIG. 2, the sleeve housing 232 including the cylindrical portion 61, which corresponds to the first tubular portion, may be either a resin-molded article or a metal die-cast article.

Figure 14:
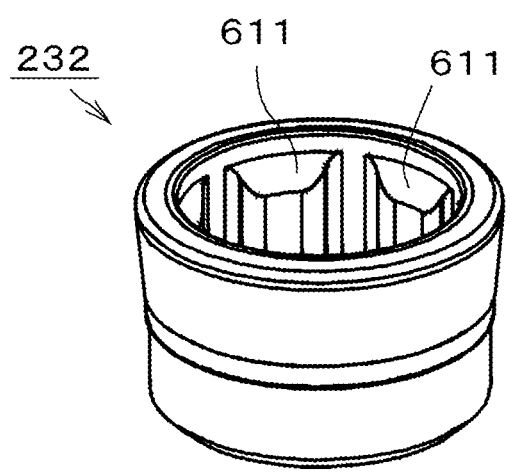
FIG. 14 is a perspective view illustrating a sleeve housing according to an example modification of the above preferred embodiment.
Figure 15:
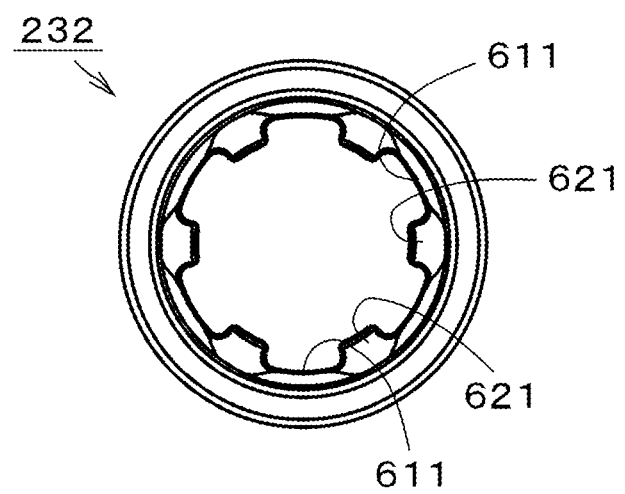
FIG. 15 is a plan view of the sleeve housing illustrated in FIG. 14.

FIG. 14 is a perspective view of a sleeve housing 232 according to an example modification of the above-described preferred embodiment. FIG. 15 is a plan view of the sleeve housing 232. In the sleeve housing 232 illustrated in FIG. 15, the number of projecting portions 621 is six, and the number of contact portions 611 is also six. Each projecting portion 621 is located circumferentially between adjacent ones of the contact portions 611. This sleeve housing 232 includes no shoulder portion 63 as illustrated in FIG. 8. The sleeve housing 232 illustrated in FIGS. 14 and 15 are otherwise similar in structure to the sleeve housing 232 illustrated in FIG. 8.

Also in the sleeve housing 232 illustrated in FIGS. 14 and 15, a circulation channel 45 is defined between adjacent ones of the contact portions 611 between an outer circumferential surface of a sleeve 231 and an inner circumferential surface of the sleeve housing 232. Because the sleeve housing 232 includes no shoulder portion 63, the circulation channel 45 is arranged to be in communication with a plate surrounding space 48 through a gap defined between a chamfer portion of a lower portion of the sleeve 231 and a corresponding one of the projecting portions 621.

Second Preferred Embodiment

Figure 16:
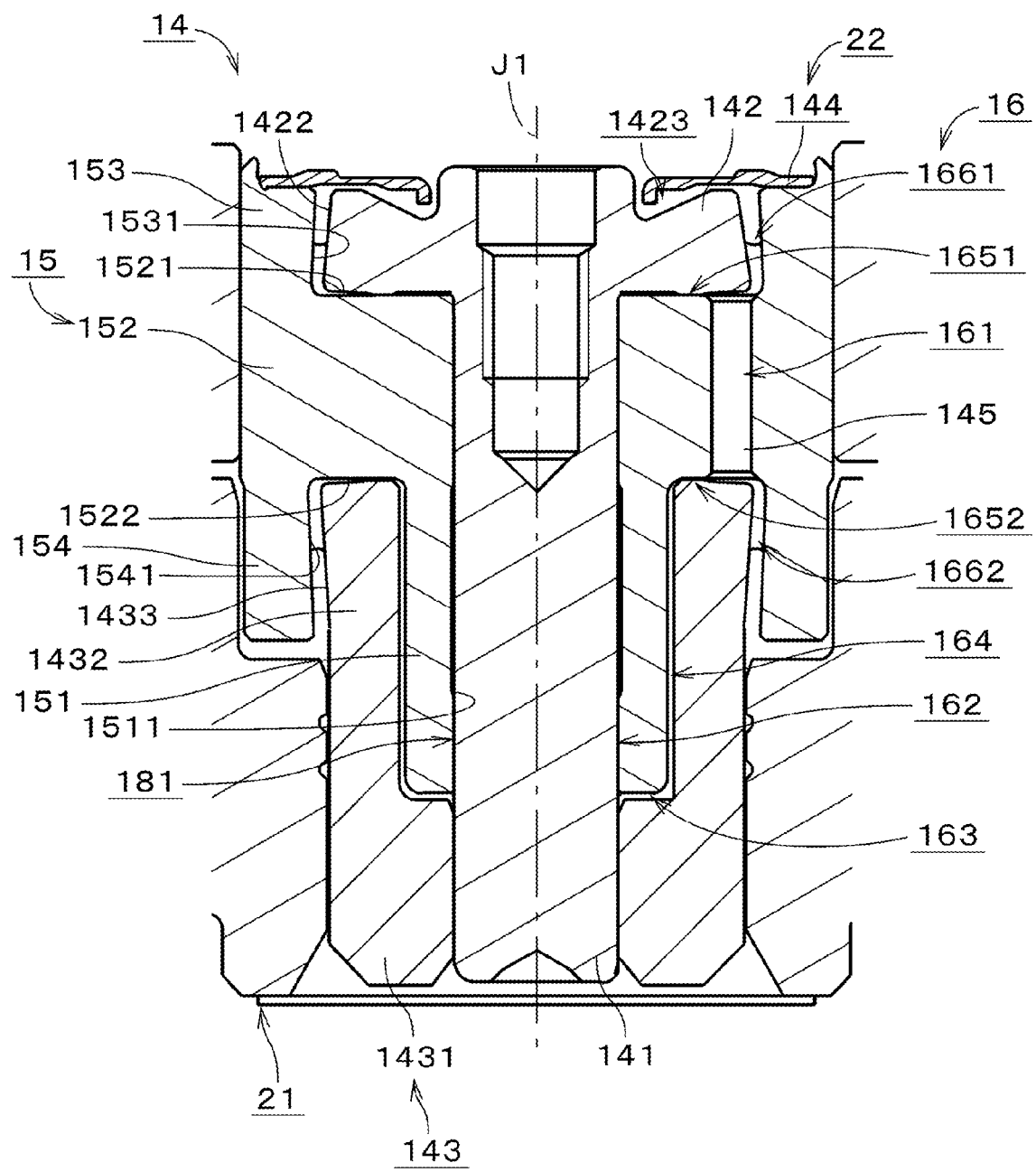
FIG. 16 is a vertical cross-sectional view of a bearing mechanism according to a second preferred embodiment of the present invention.

FIG. 16 is a diagram illustrating a bearing mechanism 14 according to a second preferred embodiment of the present invention in an enlarged form. The bearing mechanism 14 includes a shaft 141, an upper thrust portion 142, a lower thrust portion 143, a sleeve 15, a seal cap 144, and a lubricating oil 145. Each of the shaft 141, the upper thrust portion 142, and the lower thrust portion 143 is a portion of a stationary portion 21, while the sleeve 15 is a portion of a rotating portion 22. In the present preferred embodiment, a component including the shaft 141, the upper thrust portion 142, and the lower thrust portion 143 corresponds to the first component portion of the bearing mechanism, while a component including the sleeve 15 corresponds to a second component portion of the bearing mechanism. The shaft 141 is press fitted and fixed in a hole portion defined inside the lower thrust portion 143, and is arranged to extend in a vertical direction along a central axis J1. The upper thrust portion 142 is in the shape of a plate, and is arranged to extend radially outward from an upper portion of the shaft 141. The shaft 141 and the upper thrust portion 142 are defined by a single continuous member. The shaft 141 and the upper thrust portion 142 are either a resin-molded article or a metal die-cast article. An outer circumferential surface 1422 of the upper thrust portion 142 includes an inclined surface which is inclined radially inward with increasing height. The upper thrust portion 142 includes a shoulder portion 1423 recessed downward and defined in an inner edge portion of an upper surface thereof. In the present preferred embodiment, the upper thrust portion 142 corresponds to a first tubular portion.

The lower thrust portion 143 includes a lower plate portion 1431 and an outer tubular portion 1432. The lower thrust portion 143 is either a resin-molded article or a metal die-cast article. The lower plate portion 1431 is arranged to extend radially outward from a lower portion of the shaft 141. The outer tubular portion 1432 is arranged to extend upward from an outer edge portion of the lower plate portion 1431. An upper portion 1433 of an outer circumferential surface of the outer tubular portion 1432 is an inclined surface which is inclined radially inward with decreasing height. Hereinafter, the upper portion 1433 will be referred to as an "outer circumferential surface upper portion" 1433. In the present preferred embodiment, the outer tubular portion 1432 corresponds to another first tubular portion.

The sleeve 15 includes an inner tubular portion 151, a flange portion 152, an upper hub tubular portion 153, and a lower hub tubular portion 154. The inner tubular portion 151 is arranged in a substantially cylindrical space that is defined between the outer tubular portion 1432 and the shaft 141. The flange portion 152 is arranged on an upper side of the outer tubular portion 1432, and is arranged to project radially outward from an upper portion of the inner tubular portion 151. Note that, in the following description, a portion that can be considered as either an inner circumferential portion of the flange portion 152 or the upper portion of the inner tubular portion 151 is regarded as a portion of the inner tubular portion 151. Both an upper surface 1521 and a lower surface 1522 of the flange portion 152 are preferably arranged to be substantially perpendicular to the central axis J1. The flange portion 152 includes a communicating hole 161 arranged to pass through the flange portion 152 in the vertical direction. The number of communicating holes 161 is one in the present preferred embodiment.

The upper hub tubular portion 153 is arranged substantially in the shape of a cylinder, and is arranged to extend upward from an outer edge portion of the flange portion 152. The upper hub tubular portion 153 is arranged radially outward of the upper thrust portion 142. An inner circumferential surface 1531 of the upper hub tubular portion 153 includes a portion that is inclined radially inward with increasing height. In the present preferred embodiment, the upper hub tubular portion 153 corresponds to a second tubular portion.

The lower hub tubular portion 154 is arranged substantially in the shape of a cylinder, and is arranged to extend downward from the outer edge portion of the flange portion 152. The lower hub tubular portion 154 is arranged radially outward of the outer tubular portion 1432 of the lower thrust portion 143. An inner circumferential surface 1541 of the lower hub tubular portion 154 includes a portion that is inclined radially inward direction with decreasing height. In the present preferred embodiment, the lower hub tubular portion 154 corresponds to another second tubular portion.

The seal cap 144 is arranged to be annular and centered on the central axis J1. The seal cap 144 is fixed to an upper end portion of the upper hub tubular portion 153 through press fit or adhesion. The seal cap 144 is arranged to extend radially inward from the upper hub tubular portion 153, and a radially inner portion of the seal cap 144 is arranged over the shoulder portion 1423.

Referring to FIG. 16, the rotating portion 22, which includes the sleeve 15, is arranged to rotate through the lubricating oil 145 with respect to the shaft 141, the upper thrust portion 142, and the lower thrust portion 143 while the motor portion is running.

Figure 17:
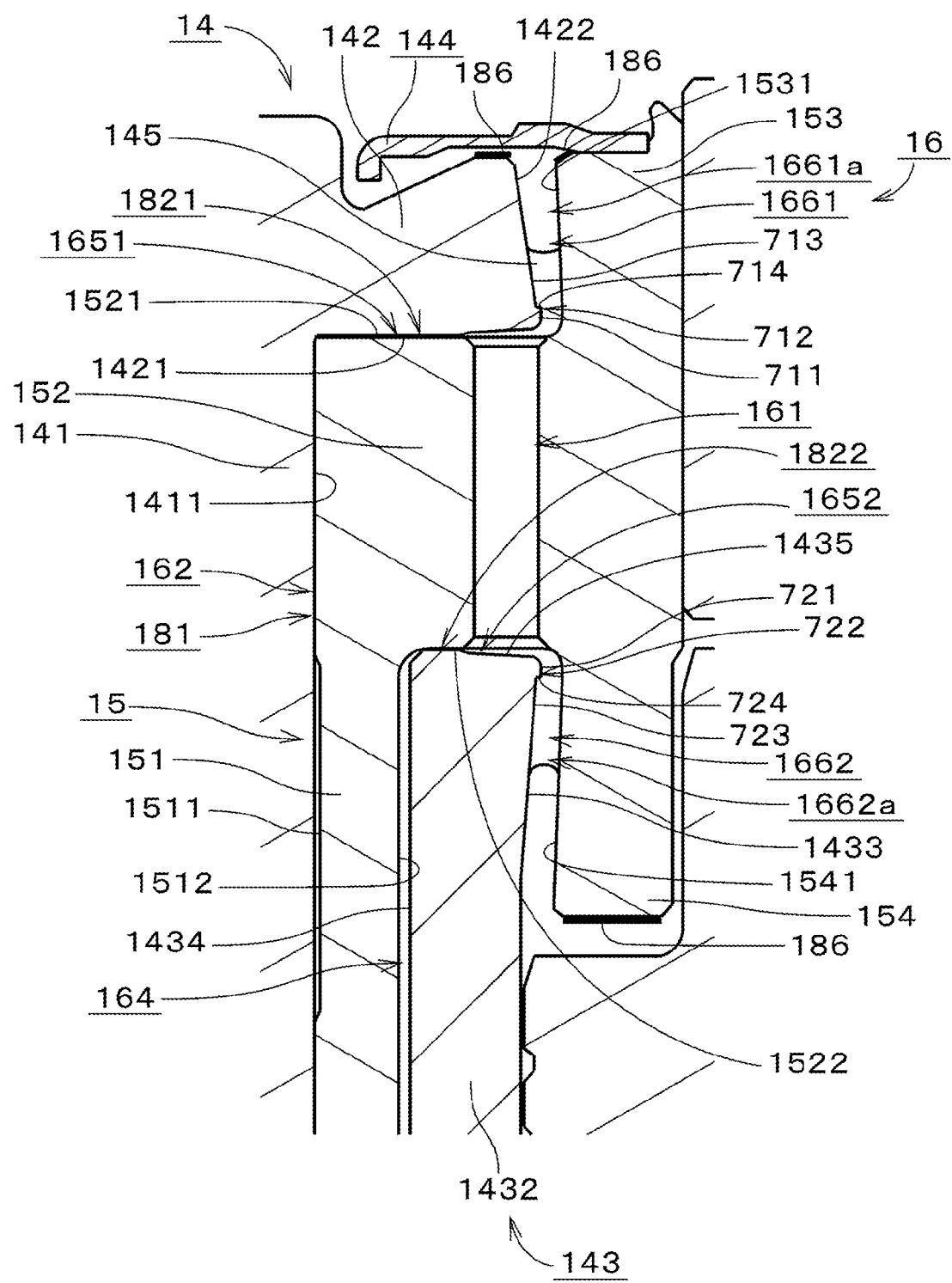
FIG. 17 is a cross-sectional view illustrating an upper portion of the bearing mechanism in an enlarged form.

FIG. 17 is an enlarged view of an upper portion of the bearing mechanism 14. An outer circumferential surface 1411 of the shaft 141 is arranged radially opposite an inner circumferential surface 1511 of the inner tubular portion 151, in which the shaft 141 is inserted. A radial gap 162 is defined between the shaft 141 and the inner tubular portion 151. Referring to FIG. 16, an axial gap 163 is defined between a lower end of the inner tubular portion 151 and the lower plate portion 1431. Hereinafter, the gap 163 will be referred to as a "lower end gap 163".

Referring to FIG. 17, a gap 164 in the shape of a cylinder is defined between an outer circumferential surface 1512 of the inner tubular portion 151 and an inner circumferential surface 1434 of the outer tubular portion 1432. Hereinafter, the gap 164 will be referred to as a "cylindrical gap 164". Referring to FIG. 16, the cylindrical gap 164 is arranged to be in communication with the radial gap 162 through the lower end gap 163. The radial width of the cylindrical gap 164 is preferably greater than the radial width of the radial gap 162 and smaller than the diameter of the communicating hole 161.

Referring to FIG. 17, a gap 1651 is defined between the upper surface 1521 of the flange portion 152 and a lower surface 1421 of the upper thrust portion 142. Hereinafter, the gap 1651 will be referred to as an "upper thrust gap" 1651. Meanwhile, a gap 1652 is defined between the lower surface 1522 of the flange portion 152 and an upper surface 1435 of the outer tubular portion 1432. Hereinafter, the gap 1652 will be referred to as a "lower thrust gap" 1652. The upper thrust gap 1651 and the lower thrust gap 1652 are arranged to be in communication with each other through the communicating hole 161. In the bearing mechanism 14, the radial gap 162, the lower end gap 163, the cylindrical gap 164, the upper thrust gap 1651, the lower thrust gap 1652, and the communicating hole 161 are arranged in this order substantially from a radial inside to a radial outside.

The inner circumferential surface 1531 of the upper hub tubular portion 153 is arranged radially opposite the outer circumferential surface 1422 of the upper thrust portion 142. A gap 1661 is defined between the upper hub tubular portion 153 and the upper thrust portion 142. Hereinafter, the gap 1661 will be referred to as an "upper seal gap" 1661. The upper seal gap 1661 is preferably arranged radially outward of both the radial gap 162 and the upper thrust gap 1651. The upper seal gap 1661 is continuous with a radially outer portion of the upper thrust gap 1651. The upper seal gap 1661 is arranged to gradually increase in width with increasing height, that is, toward an opening of the upper seal gap 1661. Moreover, the upper seal gap 1661 is arranged to be inclined toward the central axis J1, that is, to the left in FIG. 17, with increasing height.

An upper surface of the lubricating oil 145 is located in the upper seal gap 1661, and the lubricating oil 145 is held therein through capillary action. An upper seal portion 1661a arranged to hold the lubricating oil 145 is thus defined in the upper seal gap 1661. At the upper seal gap 1661, oil-repellent films 186 are preferably arranged on portions of both the inner circumferential surface 1531 and the outer circumferential surface 1422 which are above the surface of the lubricating oil 145. The opening of the upper seal gap 1661 is covered with the seal cap 144.

The inner circumferential surface 1541 of the lower hub tubular portion 154 is arranged radially opposite the outer circumferential surface upper portion 1433 of the outer tubular portion 1432. A gap 1662 is defined between the lower hub tubular portion 154 and the outer tubular portion 1432. Hereinafter, the gap 1662 will be referred to as a "lower seal gap" 1662. The lower seal gap 1662 is arranged radially outward of all of the radial gap 162, the lower end gap 163, the cylindrical gap 164, the lower thrust gap 1652, and the communicating hole 161. The lower seal gap 1662 is continuous with a radially outer portion of the lower thrust gap 1652. The lower seal gap 1662 is arranged to gradually increase in width with decreasing height, that is, toward an opening of the lower seal gap 1662. Moreover, the lower seal gap 1662 is inclined to the left in FIG. 17 with decreasing height. In the lower seal gap 1662, a lower surface of the lubricating oil 145 is located, and a lower seal portion 1662a arranged to hold the lubricating oil 145 through capillary action is defined. At the lower seal gap 1662, oil-repellent films 186 are arranged on portions of both the inner circumferential surface 1541 and the outer circumferential surface upper portion 1433 which are below the surface of the lubricating oil 145. In the bearing mechanism 14, the upper seal gap 1661 and the lower seal gap 1662 are arranged to be in communication with each other through the communicating hole 161.

In the bearing mechanism 14, the communicating hole 161 and a space 16 ranging from the upper seal gap 1661 to the lower seal gap 1662 through the upper thrust gap 1651, the radial gap 162, the lower end gap 163, the cylindrical gap 164, and the lower thrust gap 1652 are continuously filled with the lubricating oil 145. In the radial gap 162, a radial dynamic pressure bearing portion 181 arranged to generate a fluid dynamic pressure acting on the lubricating oil 145 in a radial direction is defined. In the upper thrust gap 1651, a thrust dynamic pressure bearing portion 1821, which is a dynamic pressure generation portion arranged to generate a fluid dynamic pressure acting on the lubricating oil 145 in a thrust direction, is defined. In the lower thrust gap 1652, a thrust dynamic pressure bearing portion 1822, which is a dynamic pressure generation portion arranged to generate a fluid dynamic pressure acting on the lubricating oil 145 in the thrust direction, is defined.

While the motor portion is running, the inner tubular portion 151 of the sleeve 15 is radially supported by the radial dynamic pressure bearing portion 181 with respect to the shaft 141. Meanwhile, the flange portion 152 is supported by both the thrust dynamic pressure bearing portions 1821 and 1822 in the thrust direction with respect to both the upper thrust portion 142 and the outer tubular portion 1432.

In production of the shaft 141 and the upper thrust portion 142 illustrated in FIG. 17, as in the production of the sleeve housing 232 according to the first preferred embodiment, an upper mold and a lower mold which are separated from each other in the axial direction are used. Accordingly, a maximum outside diameter portion 711, an annular shoulder portion 712, and an inclined portion 713 are arranged over an area where the outer circumferential surface 1422 of the upper thrust portion 142 is in contact with the lubricating oil 145. At the maximum outside diameter portion 711, the upper thrust portion 142 is arranged to have the greatest outside diameter. The annular shoulder portion 712 is a parting line, and includes a surface 714 facing toward the upper surface of the lubricating oil 145. At the inclined portion 713, the outside diameter of the upper thrust portion 142 is arranged to gradually decrease from the annular shoulder portion 712 toward the upper surface of the lubricating oil 145. The above arrangements contribute to reducing the likelihood that any air bubble in the lubricating oil 145 will stay in the vicinity of the maximum outside diameter portion 711.

Also in production of the lower thrust portion 143, as in the production of the sleeve housing 232 according to the first preferred embodiment, an upper mold and a lower mold which are separated from each other in the axial direction are used. Accordingly, a maximum outside diameter portion 721, an annular shoulder portion 722, and an inclined portion 723 are arranged over an area where the outer circumferential surface of the outer tubular portion 1432 is in contact with the lubricating oil 145. At the maximum outside diameter portion 721, the outer tubular portion 1432 is arranged to have the greatest outside diameter. The annular shoulder portion 722 is a parting line, and includes a surface 724 facing toward the lower surface of the lubricating oil 145. At the inclined portion 723, the outside diameter of the outer tubular portion 1432 is arranged to gradually decrease from the annular shoulder portion 722 toward the lower surface of the lubricating oil 145. The above arrangements contribute to reducing the likelihood that any air bubble in the lubricating oil 145 will stay in the vicinity of the maximum outside diameter portion 721.

The structures of the bearing mechanisms 4 and 14 and the blower fan 1 described above may be modified in a variety of manners.

For example, in the bearing mechanism 4, the first thrust dynamic pressure groove array 275 may be defined in an upper surface of the sleeve housing 232, or in a region opposed to the upper surface of the sleeve housing 232 in the lower surface of the bearing opposing portion 281. In other words, the first thrust dynamic pressure groove array 275 is defined in at least one of the upper surface of the bearing portion 23 and the lower surface of the bearing opposing portion 281. As a result, the first thrust dynamic pressure bearing portion 44a is defined between the upper surface of the bearing portion 23 and the lower surface of the bearing opposing portion 281. The second thrust dynamic pressure bearing portion 43a may be omitted. In this case, the plate portion 256 only functions as a portion to prevent the shaft 251 from coming off the bearing portion 23. The first thrust dynamic pressure bearing portion 44a may also be omitted.

In the bearing mechanism 4, the first component portion including the cylindrical portion 61, which is the first tubular portion, includes the sleeve 231, while the second component portion including the cylindrical seal portion 282, which is the second tubular portion, includes the shaft 251. In the bearing mechanism 14, the first component portion including the upper thrust portion 142 and the outer tubular portion 1432, each of which is the first tubular portion, includes the shaft 141, while the second component portion including the upper hub tubular portion 153 and the lower hub tubular portion 154, each of which is the second tubular portion, includes the sleeve 15. As described above, each of the bearing mechanisms 4 and 14 is arranged such that one of the first and second component portions includes the shaft, while the other of the first and second component portions includes the sleeve.

In the bearing mechanism 4, the lubricating oil 40 is arranged to continuously exist between a portion including the sleeve 231 and the sleeve housing 232 and a portion including the shaft 251 and the plate portion 256. In the bearing mechanism 14, the lubricating oil 145 is arranged to continuously exist between a portion including the sleeve 15 and a portion including the shaft 141, the upper thrust portion 142, and the lower thrust portion 143. As described above, each of the bearing mechanisms 4 and 14 is arranged such that the lubricating oil 40 or 145 continuously exists between a portion including the sleeve and a portion including the shaft.

In the blower fan 1, only one of the upper and lower plates 51 and 52 may include the air inlet 54. A blower fan in which the bearing mechanism 4 or 14 is provided may be an axial fan. The bearing mechanism 4 or 14 may be used in a motor used for another purpose.

Features of the above-described preferred embodiments and the modifications thereof may be combined appropriately as long as no conflict arises.

Bearing mechanisms according to preferred embodiments of the present invention may be used in a variety of applications. Preferably, bearing mechanisms according to preferred embodiments of the present invention are used in motors used for a variety of purposes.

What is claimed is:

1. A bearing mechanism comprising:
a first component portion including a first tubular portion centered on a central axis extending in a vertical direction;
a second component portion including a second tubular portion centered on the central axis, and arranged to be rotatable relative to the first component portion, an inner circumferential surface of the second tubular portion being arranged radially opposite an outer circumferential surface of the first tubular portion; and
a lubricating oil; wherein
one of the first and second component portions includes a shaft centered on the central axis, while the other of the first and second component portions includes a sleeve in which the shaft is inserted;
the lubricating oil is arranged to continuously exist between a portion including the sleeve and a portion including the shaft;
a radial dynamic pressure bearing portion is defined between the shaft and the sleeve, or a thrust dynamic pressure bearing portion is defined in a thrust gap between an upper surface of the sleeve and a member opposed to the upper surface of the sleeve;
the outer circumferential surface of the first tubular portion and the inner circumferential surface of the second tubular portion are arranged to together define a seal gap therebetween, the seal gap including a seal portion in which a surface of the lubricating oil is located;
a member including the first tubular portion is either a resin-molded article or a metal die-cast article;
the first tubular portion includes, in an area where the outer circumferential surface of the first tubular portion and the lubricating oil are in contact with each other, a maximum outside diameter portion at which the first tubular portion is arranged to have a greatest outside diameter, an annular shoulder portion including a surface facing toward the surface of the lubricating oil and at which the first tubular portion is arranged to have an outside diameter smaller than that of the maximum outside diameter portion, and an inclined portion at which the outside diameter of the first tubular portion is arranged to gradually decrease from the annular shoulder portion toward the surface of the lubricating oil; and
the outer circumferential surface of the first tubular portion includes a line joining the maximum outside diameter portion and the annular shoulder portion to each other.

2. The bearing mechanism according to claim 1, wherein a radial protrusion of the annular shoulder portion is arranged to have a width of 70 μm or less.

3. A motor comprising:
a stationary portion;
the bearing mechanism of claim 1; and
a rotating portion supported by the bearing mechanism to be rotatable with respect to the stationary portion.

4. A blower fan comprising:
a plurality of blades arranged in a circumferential direction with a central axis extending in a vertical direction as a center; and
the motor of claim 3, the motor being arranged to rotate the blades about the central axis; wherein
the blades are fixed to the rotating portion of the motor.

5. The bearing mechanism according to claim 1, wherein the first component portion includes:
the sleeve; and
a sleeve housing inside which the sleeve is arranged;
the sleeve housing includes:
a cylindrical portion being the first tubular portion, and arranged to cover an outer circumference of the sleeve; and
a bottom portion arranged to close a lower portion of the cylindrical portion;
the second component portion includes:
the shaft;
a plate-shaped portion arranged to extend radially outward from an upper end of the shaft; and
a tubular hanging-down portion being the second tubular portion, and arranged to extend downward from the plate-shaped portion; and
the sleeve housing is either a resin-molded article or a metal die-cast article.

6. The bearing mechanism according to claim 5, wherein a lower surface of the bottom portion of the sleeve housing includes a gate mark.

7. The bearing mechanism according to claim 5, wherein
the thrust gap is defined between the upper surface of the sleeve and a lower surface of the plate-shaped portion, and the thrust dynamic pressure bearing portion is defined in the thrust gap; and
a radial protrusion of the annular shoulder portion is arranged to have a width greater than half a width of the thrust gap.

8. The bearing mechanism according to claim 5, wherein a radial protrusion of the annular shoulder portion is arranged to have a width of 70 μm or less.

9. A motor comprising:
a stationary portion;
the bearing mechanism of claim 5; and
a rotating portion supported by the bearing mechanism to be rotatable with respect to the stationary portion.

10. A blower fan comprising:
a plurality of blades arranged in a circumferential direction with a central axis extending in a vertical direction as a center; and
the motor of claim 9, the motor being arranged to rotate the blades about the central axis; wherein
the blades are fixed to the rotating portion of the motor.

11. The bearing mechanism according to claim 5, wherein an outer edge portion of an upper surface of the cylindrical portion of the sleeve housing includes an annular slanting surface arranged to gradually increase in diameter with decreasing height.

12. The bearing mechanism according to claim 3, wherein a lower surface of the bottom portion of the sleeve housing includes a gate mark.

13. The bearing mechanism according to claim 11, wherein
the thrust gap is defined between the upper surface of the sleeve and a lower surface of the plate-shaped portion, and the thrust dynamic pressure bearing portion is defined in the thrust gap; and
a radial protrusion of the annular shoulder portion is arranged to have a width greater than half a width of the thrust gap.

14. The bearing mechanism according to claim 11, wherein a radial protrusion of the annular shoulder portion is arranged to have a width of 70 μm or less.

15. A motor comprising:
a stationary portion;
the bearing mechanism of claim 11; and
a rotating portion supported by the bearing mechanism to be rotatable with respect to the stationary portion.

16. A blower fan comprising:
a plurality of blades arranged in a circumferential direction with a central axis extending in a vertical direction as a center; and
the motor of claim 15, the motor being arranged to rotate the blades about the central axis; wherein
the blades are fixed to the rotating portion of the motor.

* * * * *